US007290854B2

(12) United States Patent
Mizutani et al.

(10) Patent No.: US 7,290,854 B2
(45) Date of Patent: Nov. 6, 2007

(54) INK JET RECORDING METHOD AND INK JET RECORDING APPARATUS

(75) Inventors: Michinari Mizutani, Kanagawa (JP); Torachika Osada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 11/000,812

(22) Filed: Dec. 1, 2004

(65) Prior Publication Data

US 2005/0122377 A1  Jun. 9, 2005

(30) Foreign Application Priority Data

Dec. 4, 2003  (JP) ............................. 2003-405903
Oct. 25, 2004  (JP) ............................. 2004-309552

(51) Int. Cl.
*B41J 2/145* (2006.01)
*B41J 2/15* (2006.01)
(52) U.S. Cl. .......................................... 347/41; 347/15
(58) Field of Classification Search .................. 347/15, 347/41, 43
See application file for complete search history.

(56) References Cited

U.S. PATENT DOCUMENTS

| 5,696,542 | A | * | 12/1997 | Matsubara et al. | ............ 347/12 |
| 6,003,970 | A | * | 12/1999 | Fujita et al. | .................. 347/41 |
| 6,036,300 | A | | 3/2000 | Suzuki et al. | |
| 6,206,502 | B1 | * | 3/2001 | Kato et al. | ..................... 347/41 |
| 6,547,361 | B1 | | 4/2003 | Suzuki et al. | |
| 6,779,873 | B2 | * | 8/2004 | Maeda et al. | ................. 347/43 |
| 7,121,641 | B2 | | 10/2006 | Nitta et al. | |
| 2003/0035023 | A1 | | 2/2003 | Miura | |
| 2003/0085947 | A1 | | 5/2003 | Miura | |

FOREIGN PATENT DOCUMENTS

JP   06-344574   12/1994

* cited by examiner

*Primary Examiner*—Thinh Nguyen

(57) ABSTRACT

An ink jet recording apparatus and an ink jet recording method to prevent both of adjacent ejection orifice groups from operating at high duties. The method includes distributing image data such that the ejection duty of one of the adjacent ejection orifice groups is lower than a predetermined threshold in one scan and the ejection duty of the other ejection orifice group is lower than the predetermined threshold in another scan.

8 Claims, 27 Drawing Sheets

CARRIAGE MOVING DIRECTION

H1107a   H1107a   H1107a

← CARRIAGE MOVING DIRECTION

C1

MASK PATTERNS FOR FIRST PASS

RECORDING RATE 50% (THINNING RATE 50%)

Y1

RECORDING RATE 50% (THINNING RATE 50%)

M1

RECORDING RATE 50% (THINNING RATE 50%)

C2

MASK PATTERNS FOR SECOND PASS

RECORDING RATE 50% (THINNING RATE 50%)

Y2

RECORDING RATE 50% (THINNING RATE 50%)

M2

RECORDING RATE 50% (THINNING RATE 50%)

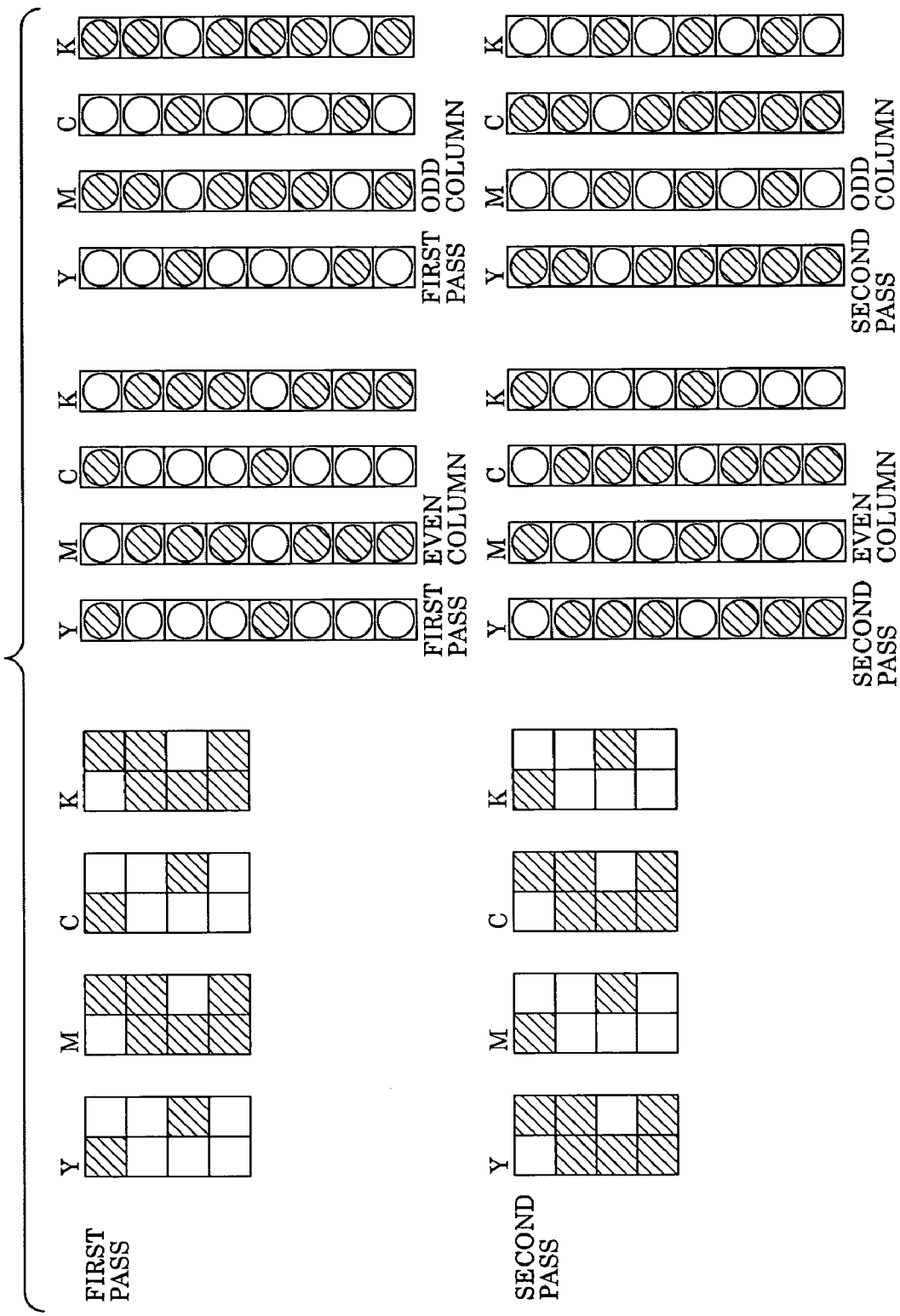

INK JET RECORDING METHOD AND INK JET RECORDING APPARATUS

BACKGROUND OF THE INVENTION

1. Field of the Invention

The present invention relates to an ink jet recording method and an ink jet recording apparatus in which an ink jet head is employed to record an image on a recording medium.

2. Description of the Related Art

In an ink jet recording apparatus in which an image is recorded on a recording medium by using an ink jet recording head having a plurality of ejection orifices to eject ink, small ink droplets called satellites are often generated with a main ink droplet (hereinafter referred to also as a "main droplet") and ejected through the ejection orifice of the recording head. FIGS. 3A to 3D show behaviors of the satellites generated. With the lapse of time in sequence of FIGS. 3A, 3B, 3C and 3D, an ejected ink droplet is separated into a main droplet 10 and a group of small plural satellites 112. Also, though not shown, when the main droplet strikes against the recording medium, very small ink droplets may generate in the form of splashed ink from the recording medium. If those small ink droplets (hereinafter referred to also as "ink mists" or simply as "mists") attach to the ejection orifice surface of the recording head, an ink pool may generate on the ejection orifice surface and may cause an ejection failure. In particular, when the ejection duty of ink ejected per unit time is high, the ink mists generate in a larger amount and a possibility of the ejection failure increases.

Various methods have hitherto been proposed to avoid the ejection failure caused by the ink mists. According to Japanese Patent Laid-Open No. 05-309874, for example, the number of passes in multi-pass recording is increased in the case of a high duty as compared with the case of a low duty. This method is able to reduce an amount of ink ejected per unit time and to reduce an amount of ink mists generated.

Also, according to Japanese Patent Laid-Open No. 06-344574, the number of times of wiping is increased in the case of a high duty in which the ink mists are relatively easy to occur as compared with the case of a low duty in which the ink mists are relatively hard to occur. This method is effective in avoiding ejection failure because even when the ink mists are attached to the ejection orifice surface, the attached ink mists are immediately cleaned off.

With the methods disclosed in the above-cited Japanese Patent Laid-Open Nos. 05-309874 and 06-344574, however, the recording speed reduces because the number of passes and the number of times of wiping are increased in the case of a high duty.

Meanwhile, in the recent ink jet market, there has been a demand for outputting an image with high quality, like photographic quality, at a high speed. To satisfy such a demand, an ink jet head has an increasing tendency toward a smaller droplet size, a higher density of ejection orifices, and a larger length. Correspondingly, a recording apparatus equipped with such an ink jet head faces an increasing tendency toward a higher head scan speed and a higher driving frequency.

In those situations, the amount of ink mists generated in the case of a high duty and attached to the ejection orifice surface (i.e., the surface in which the ejection orifices are formed) increases more and more. For that reason, any action to avoid the ejection failure caused by the attached mists is required.

As a result of intensive study in the relationship between the ink ejection duty and the amount of ink mists attached to the ejection orifice surface, new findings have been confirmed in two points, i.e., 1) the amount of the attached ink mists generally tends to increase in the case of a high duty, but the amount of the attached ink mists is not always so increased as to cause the ejection failure even in the case of a high duty, and 2) when two adjacent ejection orifice groups each have a high duty, there is a tendency that the amount of the attached ink mists is so increased as to cause the ejection failure. Those new findings will be described in more detail below with reference to FIGS. 4, 5A and 5B.

FIG. 4 shows an ink droplet ejection state when a secondary color image is recorded by continuously ejecting ink droplets through ejection orifices in a half of each of two adjacent ejection orifice groups while moving an ink jet head (recording head) H1001, which is capable of ejecting inks in different colors, at a high speed relative to a recording medium 3. The recording head H1001 is moved in a direction indicated by an arrow in FIG. 4, and ejection orifices H1107 in the recording head H1001 are arrayed in a direction substantially perpendicular to the head moving direction. When image data has a high duty, an ejection energy generator (not shown) corresponding to each ejection orifice of each of the ejection orifice groups used for forming the secondary color is driven at a high driving frequency. Therefore, as an ink droplet 10 ejected through the ejection orifice H1107 moves toward the recording medium 3, air having viscosity and residing around the ink droplet 10 is also moved while being entrained with the movement of the ink droplet 10. As a result, the vicinity of the ejection orifice surface tends to have lower pressure than the surrounding of the recording medium 3. The ambient air is caused to flow toward a depressurized area (i.e., the vicinity of the ejection orifice surface), thereby generating air streams 1 that curl upward from the recording medium 3. Then, it has been confirmed that mists are splashed when the ink droplet 10 and satellites flying in accompanying with the ink droplet 10 strike against the recording medium 3. The splashed mists are attracted toward the ejection orifice surface side of the recording head H1001 under the action of the air streams 1.

When a high-duty image is recorded under such a condition with the so-called multi-pass recording in which the image is recorded by moving the recording head many times over the same area of the recording medium, ink mists 47 are attached to the ejection orifice surface of the recording head H1001 as shown in FIGS. 5A and 5B. FIG. 5A shows a state of mists attaching to the ejection orifice surface when a high-duty primary color image (e.g., a cyan image with a 36% duty) is formed, and FIG. 5B shows a state of mists attaching to the ejection orifice surface when a high-duty secondary color image (e.g., a mixed image with a 36% duty of a cyan image with a 18% duty and a yellow image with a 18% duty) is formed by high-duty ejection from each of the adjacent ejection orifice groups. As seen from FIGS. 5A and 5B, because ink droplets are ejected from the two ejection orifice groups at a high frequency in the case of a secondary color, a tendency to cause a pressure reduction is increased in comparison with the case of a primary color, and the ink mists 47 are more apt to reach the ejection orifice surface of the recording head H1001. Thus, even at the same high duty, the mists are attached to the ejection orifice surface in such a small amount as not causing the ejection failure in the case of a primary color, while the mists are attached to the ejection orifice surface in such a large amount as possible causing the ejection failure in the case of a secondary color in which the image is recorded by using the adjacent ejection orifice groups.

As a result of more detailed analysis conducted by the inventors, it has been confirmed that, in a head having the ejection orifice surface subjected to water repellent treatment substantially all over the ejection orifice surface, the ink mists tend to attach in a larger amount in areas farther away from the ejection orifices. For example, when the secondary color is recorded by using the adjacent ejection orifice groups, a large number of ink mist masses 48 having grown to sizes of about 300 µm to 500 µm diameters are produced in areas away from the ejection orifices by a distance of about 500 µm to 1 mm, as shown in FIG. 5B. In the water repellent area of the ejection orifice surface where those ink mist masses 48 are present, a contact angle for water (ink) is large and the ink has high fluidity. Hence, the ink mist masses 48 are easily movable on the ejection orifice surface with the movement of the recording head, and eventually reach the ejection orifices. Consequently, the ink mist masses 48 are drawn into the ejection orifices of one to several nozzles, thus resulting in non-ejection of the ink.

As described above, in the current situation in which ink droplets are ejected at a high driving frequency in a recording head having a small droplet size, a high density of ejection orifices, and a large length, while moving the head at a high speed, any action must be taken because the amount of attached mists increases beyond an allowable range when both of adjacent ejection orifice groups have high duties.

SUMMARY OF THE INVENTION

The present invention is directed to an ink jet recording method and an ink jet recording apparatus in which an ejection failure caused by ink mists attaching to the ejection orifice surface is minimized while avoiding a reduction of the recording speed.

In one aspect of the present invention, an ink jet recording method for recording an image in a unit area of a recording medium with a recording head having ejection orifice groups. Each of the ejection orifice groups includes a plurality of ejection orifices arrayed in a predetermined direction to eject ink and being arranged in a direction different from the predetermined direction. The method includes scanning the recording head relative to the unit area a plurality of times; distributing image data corresponding to the unit area to a plurality of scans; and recording the image in the unit area in each of the plurality of scans in accordance with the image data distributed in the distributing step in order to complete the image to be recorded in the unit area, wherein the image data corresponding to each of adjacent ejection orifice groups is distributed to the plurality of scans in the distributing step such that a recording duty of one of the adjacent ejection orifice groups is lower than a predetermined threshold in each of the plurality of scans.

In another aspect of the present invention, an ink jet recording method for recording an image on a recording medium with a recording head having ejection orifice groups. Each ejection orifice group includes a plurality of ejection orifices arrayed in a predetermined direction to eject ink and is arranged in a direction different from the predetermined direction. The method includes the steps of scanning the recording head relative to each of a plurality of unit areas of the recording medium a plurality of times; moving the recording medium and the recording head relative to each other in a sub-scan direction crossing a scan direction during a period between successive scans; distributing image data corresponding to the unit area to the plurality of scans by thinning the image data corresponding to the unit area with a mask pattern in each of the plurality of scans relative to the unit area; and recording a thinned image in the unit area in each of the plurality of scans in accordance with the thinned image data, thereby completing the image to be recorded in the unit area, wherein a thinning rate of each mask pattern for thinning the image data corresponding to each of adjacent ejection orifice groups is preset such that a recording duty of one of the adjacent ejection orifice groups is lower than a predetermined threshold in each of the plurality of scans.

In yet another aspect of the present invention, an ink jet recording method for recording an image in a unit area of a recording medium with a recording head having ejection orifice groups, wherein each of the ejection orifice groups includes a plurality of ejection orifices arrayed in a predetermined direction to eject ink and being arranged in a direction different from the predetermined direction. The method includes the steps of scanning the recording head relative to the unit area a plurality of times; obtaining, for each adjacent ejection orifice group, information regarding an ink amount to be applied to the unit area based on the image data corresponding to the unit area; determining, based on the information obtained in the obtaining step, whether the ink amount applied from each adjacent ejection orifice group per unit time exceeds a predetermined threshold; and distributing, responsive to determining that the ink amounts applied from both adjacent ejection orifice groups per unit time exceed the predetermined threshold in the determining step, the image data corresponding to each of the adjacent ejection orifice groups to the plurality of scans such that the ink amount applied from one of the adjacent ejection orifice groups is lower than the predetermined threshold in each of the plurality of scans.

In yet still another aspect of the present invention, an ink jet recording apparatus for recording an image in a unit area of a recording medium includes: a recording head having ejection orifice groups, wherein each ejection orifice group includes a plurality of ejection orifices arrayed in a predetermined direction to eject ink and being arranged in a direction different from the predetermined direction; a scanning unit coupled to the recording head to scan the recording head relative to the unit area a plurality of times; a distributor configured to distribute image data corresponding to the unit area to a plurality of scans; and a recording control unit configured to record an image in the unit area in each of the plurality of scans in accordance with the image data distributed by the distributor, thereby completing the image to be recorded in the unit area, wherein the distributor distributes the image data corresponding to each adjacent ejection orifice group to the plurality of scans such that a recording duty of one of the adjacent ejection orifice groups is lower than a predetermined threshold in each of the plurality of scans.

Still further, an ink jet recording apparatus operable to record an image on a recording medium includes: a recording head having ejection orifice groups, wherein each group includes a plurality of ejection orifices arrayed in a predetermined direction to eject ink and is arranged in a direction different from the predetermined direction; a scanning unit configured to scan the recording head relative to a plurality of unit areas of the recording medium by a plurality of times; a moving unit configured to move the recording medium and the recording head relative to each other in a sub-scan direction crossing a scan direction during a period between successive scans; a distributing unit configured to distribute image data corresponding to the unit area to the plurality of scans by thinning the image data corresponding to the unit area with a mask pattern in each of the plurality of scans relative to the unit area; and a recording control unit configured to record a thinned image in the unit area in each of the plurality of scans in accordance with the thinned image data, thereby completing the image to be recorded in the unit area, wherein a thinning rate of each mask pattern for thinning the image data corresponding to each adjacent ejection orifice groups is preset such that a recording duty of one of the adjacent ejection orifice groups is lower than a predetermined threshold in each of the plurality of scans.

Still further, an ink jet recording apparatus operable to record an image in a unit area of a recording medium includes: scanning unit coupled to the recording head to scan the recording head relative to the unit area a plurality of times; a recording head having ejection orifice groups, each of the ejection orifice groups including a plurality of ejection orifices arrayed in a predetermined direction to eject ink and being arranged in a direction different from the predetermined direction; an obtaining unit configured to obtain, for each adjacent ejection orifice group, information regarding an ink amount to be applied to the unit area based on the image data corresponding to the unit area; a determining unit configured to determine, based on the information obtained by the obtaining unit, whether the ink amount applied from each of the adjacent ejection orifice groups per unit time exceeds a predetermined threshold; and a distributing unit configured to distribute, responsive to the determining unit determining that the ink amounts applied from both adjacent ejection orifice groups per unit time exceed the predetermined threshold, the image data corresponding to each of the adjacent ejection orifice groups to the plurality of scans such that the ink amount applied from one of the adjacent ejection orifice groups is lower than the predetermined threshold in each of the plurality of scans.

According to the present invention, since the image is formed by setting, in the same scan, the ejection duty of one of the adjacent ejection orifice groups to be higher than the threshold and the ejection duty of the other ejection orifice group to be lower than the threshold, an escape path is produced to allow air streams to flow from the higher ejection duty side toward the lower ejection duty side. As a result, the amount of mists attached to the ejection orifice surface of the recording head can be reduced and an ejection failure caused by the attached mists can be suppressed.

Further features and advantages of the present invention will become apparent from the following description of the embodiments with reference to the attached drawings.

BRIEF DESCRIPTION OF THE DRAWINGS

FIG. 20 shows the relationships between mask patterns and recording nozzles used in the third embodiment.

DESCRIPTION OF THE EMBODIMENTS

The term "recording" used in this specification means not only the case of forming significant information, such as characters and figures, but also the case of forming a wide range of objects, such as images, textures and patterns, on a recording medium and the case of processing the recording medium regardless of whether the images, etc. are significant or insignificant, and regardless of whether the images, etc. are apparent to be visually perceivable by persons. Also, the term "recording medium" includes not only ordinary paper used in general recording apparatuses, but also other materials capable of accepting ink, such as cloth, plastic films, metallic plates, glass, ceramics, woods and leather. Further, the term "ink" (referred to also as a "liquid") should be widely interpreted like the above definition of "recording", and includes liquids serving to form images, textures, patterns, etc., to process a print medium, or to treat the ink (such as to solidify or make insoluble colorants in the ink applied to the print medium). Thus, the "ink" includes all kinds of liquids that can be used in the recording.

First Embodiment

A first embodiment of the present invention will be described below with reference to the drawings.

(1) Outline of Overall Construction

Figure 6:
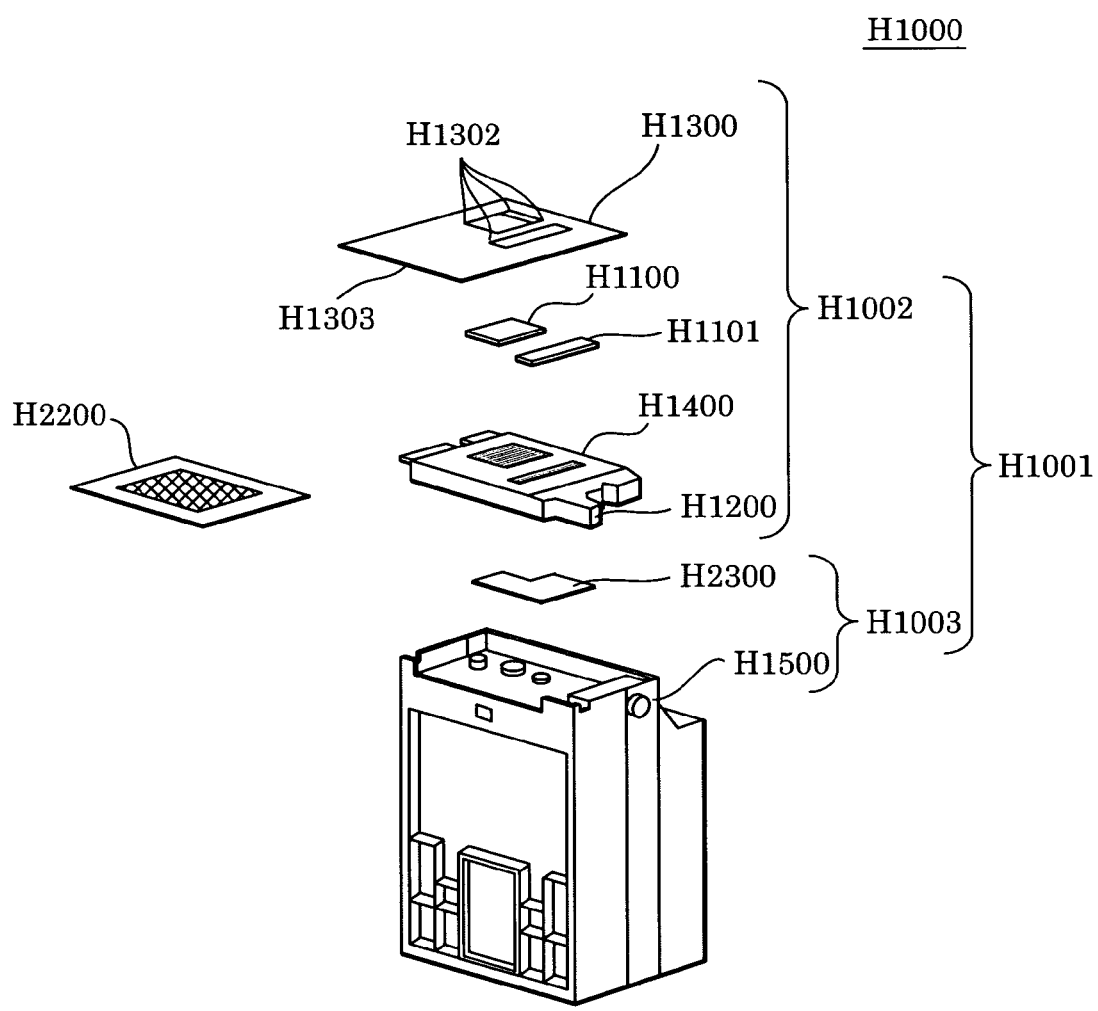
FIG. 6 is a perspective view showing, in an exploded state, an external appearance of a recording head cartridge which can be employed in the present invention.
Figure 9:
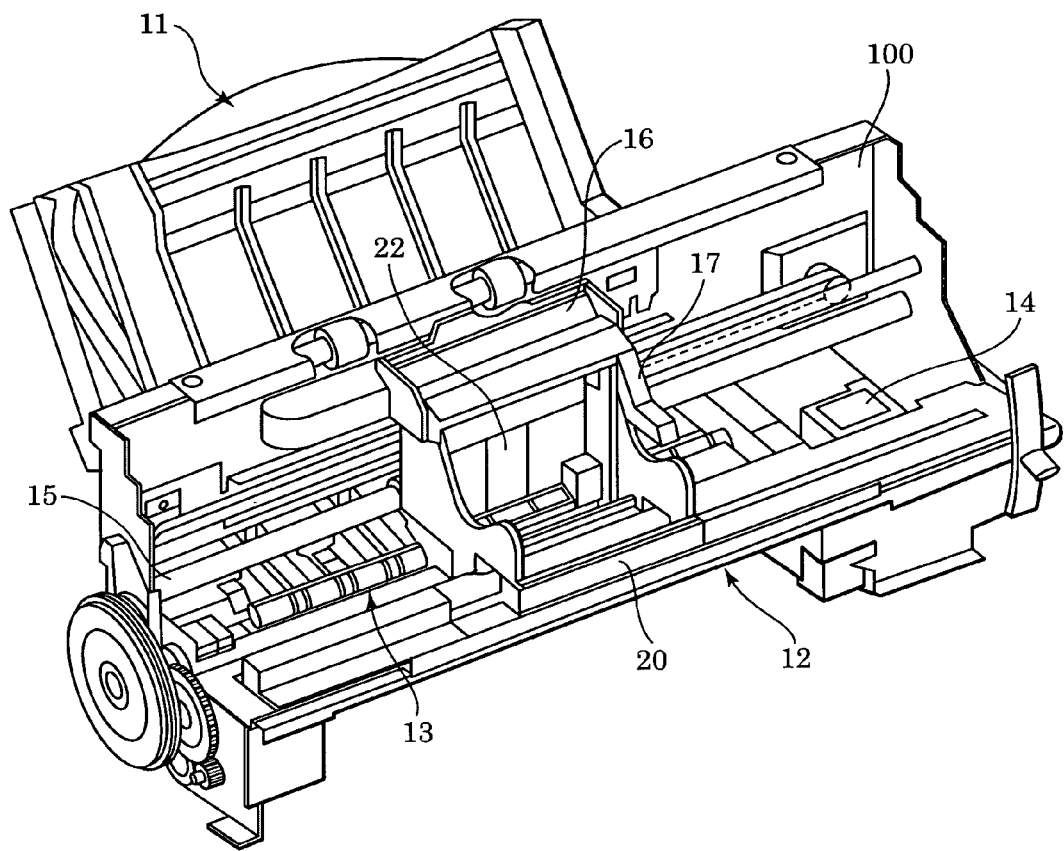
FIG. 9 shows an external appearance of a mechanism assembly in an ink jet printer which can be employed in the present invention.
Figure 10:
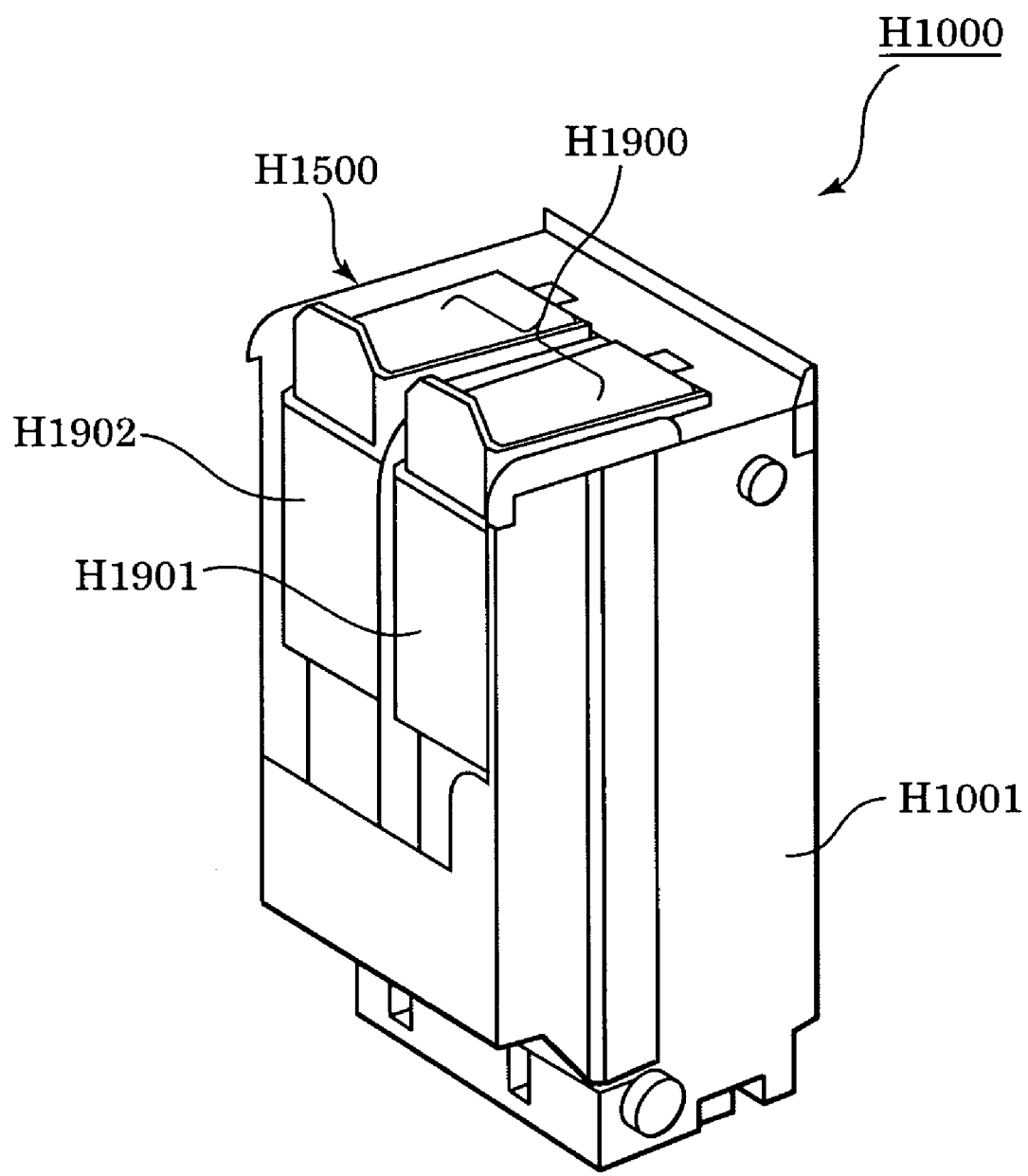
FIG. 10 shows an external appearance of a recording head cartridge which can be employed in the present invention.

First, with reference to FIGS. 6, 9 and 10, a description is made of respective constructions of a recording head cartridge, a recording head, an ink tank, and an ink jet recording apparatus, which can be employed in this embodiment, and the relationships among them.

As seen from perspective views of FIGS. 6 and 10, a recording head cartridge H1000 includes a recording head H1001 and an ink tank H1900 (H1901, H1902) detachably mounted to the recording head H1001. As shown in FIG. 9, the recording head cartridge H1000 is detachably mounted to a carriage 16 disposed in a body of the ink jet recording apparatus, and is fixedly supported by a positioning means and an electrical contact on the carriage 16. The ink tank H1901 contains a black ink, and the ink tank H1902 contains cyan (C), magenta (M) and yellow (Y) inks. Thus, the ink tanks H1901, H1902 are detachably mounted to the recording head H1001.

(2) Recording Head

The recording head H1001 will be described in more detail with reference to FIGS. 6 to 8.

The recording head H1001 is a recording head of the type including, for each ejection orifice, an electro-thermal transducer to produce thermal energy sufficient to cause film boiling in the ink in response to an electric signal.

As shown in FIG. 6, the recording head H1001 includes a recording device unit H1002 and an ink supply unit H1003. The recording device unit H1002 includes a first recording device board H1100, a second recording device board H11001, a first plate H1200, an electric wiring tape H1300, an electric contact board H2200, and a second plate H1400. The ink supply unit H1003 includes an ink supply member H1500, a channel forming member (not shown), a joint sealing member H2300, a filter (not shown), and a sealing rubber (not shown).

(2-1) Recording Device Unit

Figure 7:
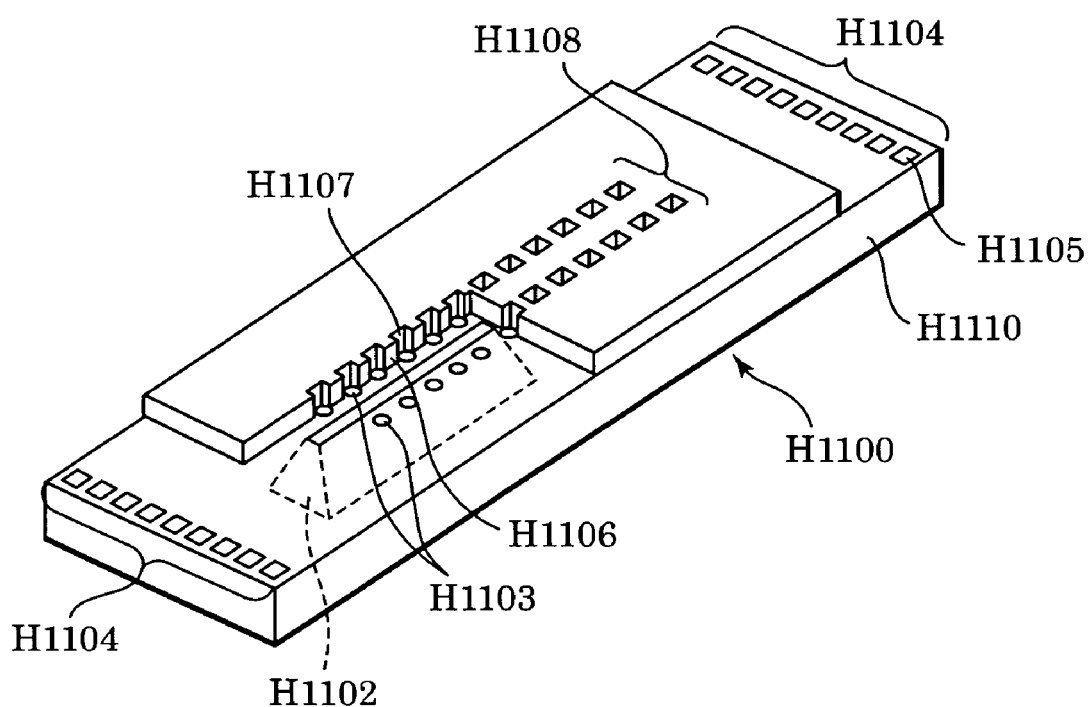
FIG. 7 is a perspective view of a recording device board which can be employed in the present invention.

FIG. 7 is a perspective view, partly broken away, explaining the first recording device board H1100. The first recording device board H1100 is a recording device board for ejecting a black ink. In the first recording device board H1100, an ink supply opening H1102 in the form of a through hole like a long groove is formed, as an ink channel, in a Si (silicon) substrate H1110 with a thickness of 0.5 to 1 mm, for example, by anisotropic etching, sand blasting, or any other technique based on crystal orientation of Si. Two rows of electro-thermal transducers H1103 are arranged in a zigzag pattern on both sides of the ink supply opening H1102 in one-to-one relation. The electro-thermal transducers H1103 and electric wirings made of, e.g., Al for supplying electric power to the electro-thermal transducers H1103 are formed by the so-called film forming technique. Further, electrode sections H1104 for supplying electric power to the electric wirings are arranged on both sides outside the rows of electro-thermal transducers H1103, and bumps H1105 made of, e.g., Au are formed in the electrode sections H1104. An ink channel wall H1106 and ejection orifices H1107, which define ink channels corresponding to the electro-thermal transducers H1103, are formed on the Si substrate by photolithography using a resin material. Thus, an ejection orifice group H1108 including the ejection orifices H1107 arrayed in two rows is formed as shown in FIG. 7. The ink (black ink in this embodiment) supplied through the ink supply opening H1102 is ejected from the ejection orifices H1107 of the ejection orifice group H1108.

Figure 8A:
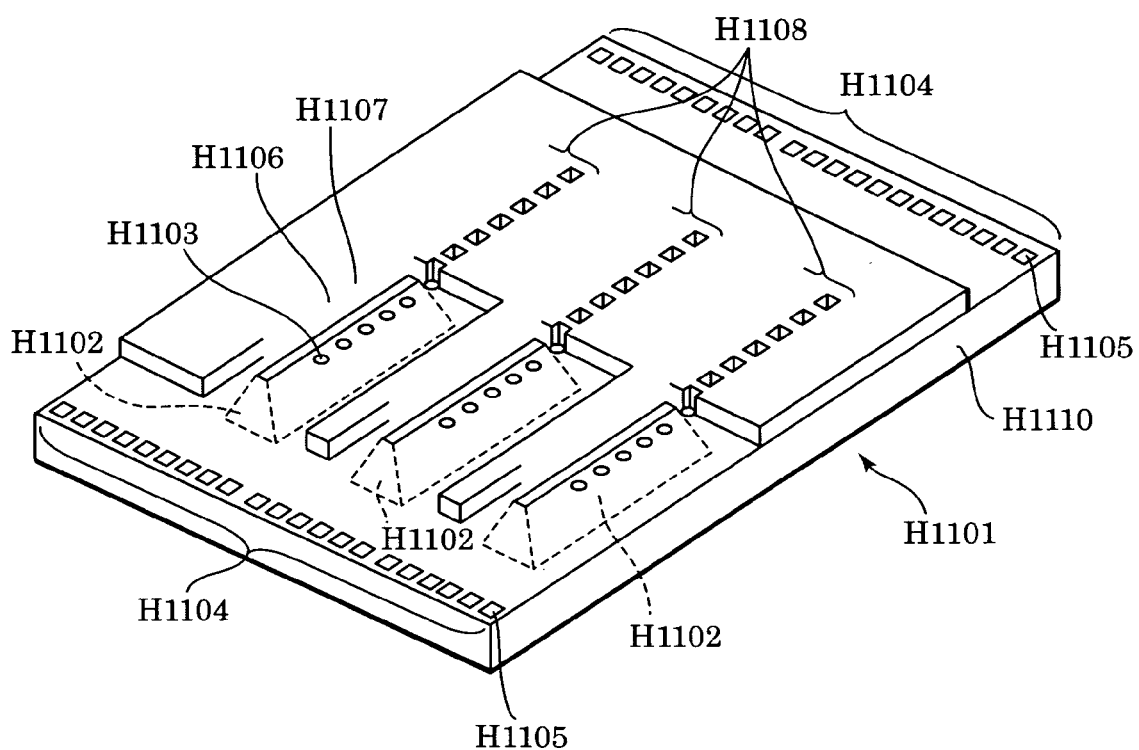
FIG. 8A is a perspective view of a second recording device board for use in a first embodiment.
Figure 8B:
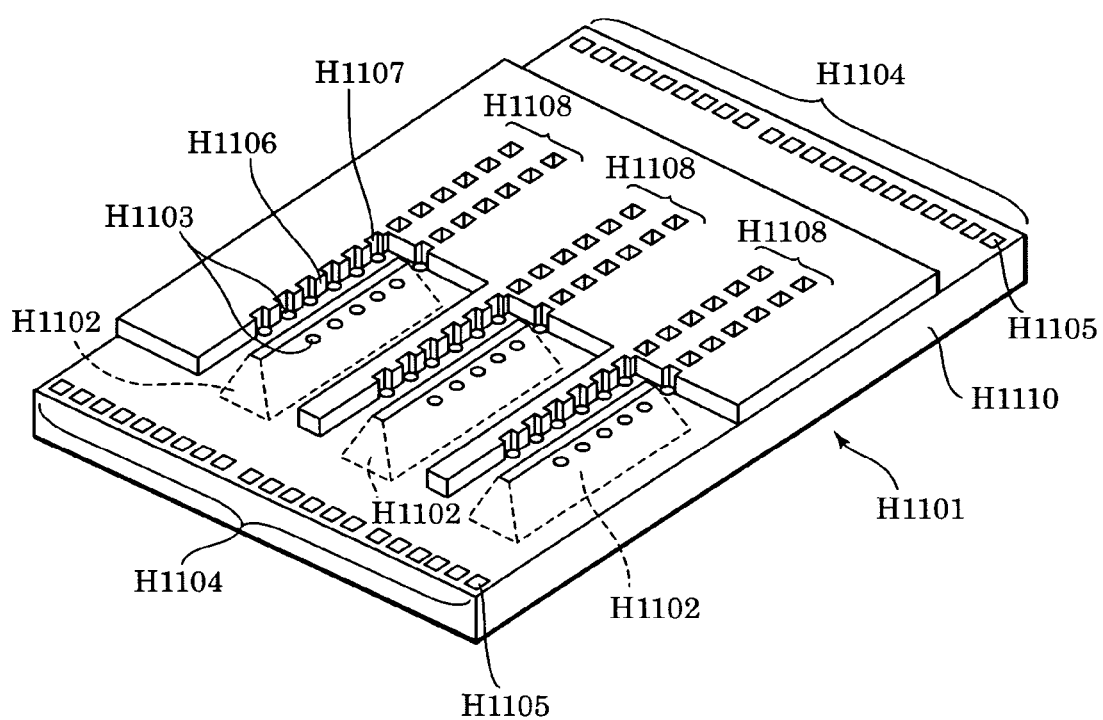
FIG. 8B is a perspective view of a second recording device board for use in a second embodiment.

FIGS. 8A and 8B are each a perspective view, partly broken away, explaining the second recording device board H1101. The second recording device board H1101 is a recording device board for ejecting three different color ink (cyan, yellow and magenta). In the second recording device board H1101, three ink supply openings H1102 are formed in parallel, and electro-thermal transducers and ejection orifices are formed on one side or both sides of each ink supply opening. As in the first recording device board H1100, the ink supply openings, the electro-thermal transducers, electric wirings, electrode sections, etc. are formed in and on a Si substrate. In addition, ink channels and the ejection orifices are formed thereon by photolithography using a resin material so as to form three ejection orifice groups H1108 corresponding to the three color inks. Further, as in the first recording device board H1100, bumps H1105 made of, e.g., Au are formed in electrode sections H1104 for supplying electric power to the electric wirings. This first embodiment employs the second recording device board shown in FIG. 8A.

Figure 2A:
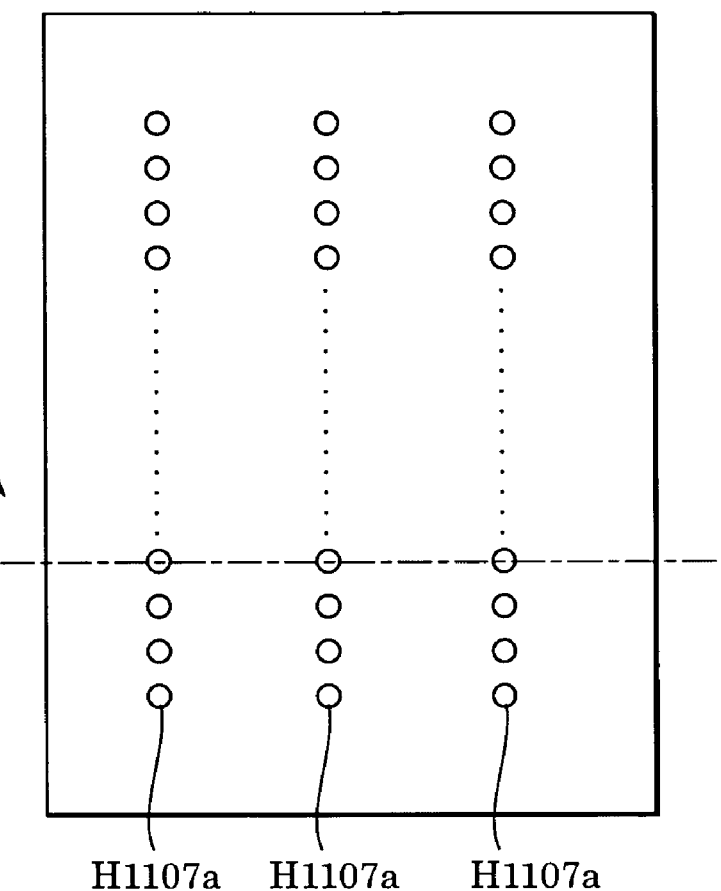
FIG. 2A is a plan view of a second recording device board shown in FIG. 8A, looking from the ejection orifice surface side.
Figure 2B:
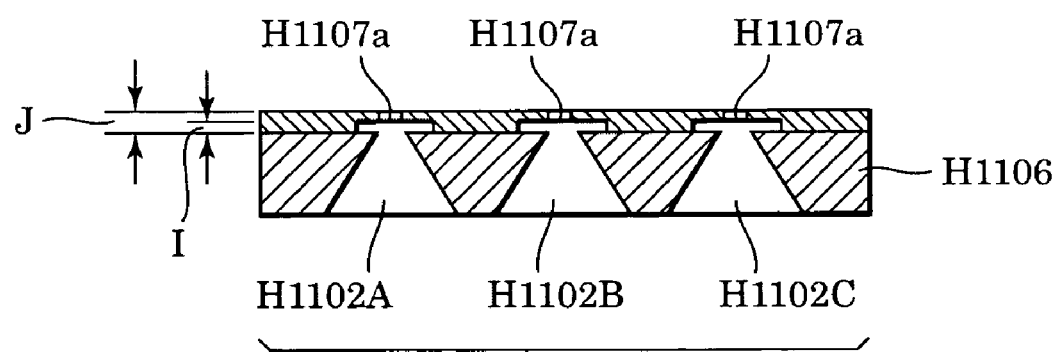
FIG. 2B is a sectional view taken along an arrow-headed line in FIG. 2A.
Figure 3A:
FIGS. 3A, 3B, 3C and 3D show states of a droplet ejected from an ink jet head in a time serial manner.
Figure 3B:
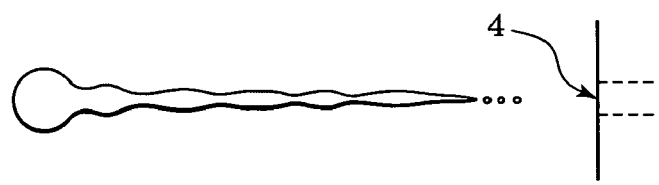
Figure 3C:
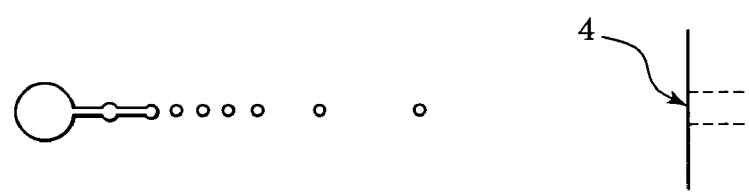
Figure 3D:

FIG. 2A is a plan view of the second recording device board shown in FIG. 8A, looking from the ejection orifice surface side, and FIG. 2B is a sectional view taken along an arrow-headed line in FIG. 2A. Three ink supply openings H1102 (H1102A, H1102B and H1102C) are formed in the single Si substrate H1110 (not shown in FIGS. 2A and 2B). The cyan ink is supplied to the ink supply opening H1102A, the yellow ink is supplied to the ink supply opening H1102B, and the magenta ink is supplied to the ink supply opening H1102C. In the ink channel wall H1106 joined to the Si substrate H1110, respective ejection orifices H1107a are formed corresponding to the ink supply opening H1102A, H1102B and H1102C. One row of ejection orifices H1107a corresponds to each of the ink supply openings H1102A, H1102B and H1102C. Then, one row of electro-thermal transducers H1103 (see FIG. 8A) serving as thermal energy generating means is arranged along each ink supply opening H1102 (H1102A, H1102B or H1102C), which has the form of a through hole like a long groove, in the lengthwise direction at a pitch of 600 dpi. The electro-thermal transducers are arranged in number 128 per row and hence in total number 384 for three C, M and Y rows. Each of the ejection orifices H1107a has a diameter φ of about 16.5 µm and ejects the ink in amount of about 5 pl (picoliter).

The first plate H1200 shown in FIG. 6 is formed of alumina ($Al_2O_3$) plate with a thickness of 0.5 to 10 mm. The first plate H1200 is not limited in its material to alumina, but it may be formed of any suitable material having a linear expansion rate comparable to that of the material of the first recording device board H1100 and a thermal conduction rate comparable to or higher than that of the material of the first recording device board H1100. The first plate H1200 can be made of, e.g., silicon (Si), aluminum nitride (AlN), zirconia, silicon nitride ($Si_3N_4$), silicon carbide (SiC), molybdenum (Mo), or tungsten (W). The first plate H1200 has formed therein an ink supply opening for supplying the black ink to the first recording device board H1100 and ink supply openings for supplying the cyan, magenta and yellow inks to the second recording device board H1101. The ink supply openings H1102 in the recording device boards correspond to the ink supply openings in the first plate H1200, respectively. The first recording device board H1100 and the second recording device board H1101 are fixedly bonded to the first plate H1200 with high position accuracy. A first adhesive used for bonding the first plate H1200 may have low viscosity, a low curing temperature, a short curing time, relatively high hardness after the curing, and durability against the inks. The first adhesive is, e.g., a thermosetting adhesive made of primarily an epoxy resin, and the thickness of an adhesive layer may not be larger than 50 μm.

Further, as shown in FIG. 6, the electric wiring tape H1300 applies, to the first recording device board H1100 and the second recording device board H1101, electric signals for ejecting the inks. The electric wiring tape H1300 has a plurality of openings in which the respective recording device boards are assembled, electrode terminals H1302 corresponding to the electrode sections H1104 of the respective recording device boards, and an electrode terminal section H1303 positioned at the end of the electric wiring tape H1300 for electrical connection to the electric contact board H2200 having external signal input terminals H1301 (see FIG. 11) to receive electric signals from a main unit. The electrode terminals H1302 and the electrode terminal section H1303 are interconnected by continuous wiring patterns formed of copper foils.

The electric wiring tape H1300, the first recording device board H1100, and the second recording device board H1101 are interconnected. For example, the respective electrode sections 1104 of both the recording device boards and the electrode terminals H1302 of the electric wiring tape H1300 are joined to each other for electrical connection by ultrasonic hot melting.

The second plate H1400 is a single plate-like member with a thickness of, e.g., 0.5 to 1 mm and is made of a metallic material such as alumina (Al$_2$O$_3$) or another ceramic, Al, or SUS. The second plate H1400 has openings larger than respective outer dimensions of the first recording device board H1100 and the second recording device board H1101 which are both fixedly bonded to the first plate H1200. Further, the second plate H1400 is bonded to the first plate H1200 by using a second adhesive such that the first recording device board H1100 and the second recording device board H1101 are electrically connected to the electric wiring tape H1300 in a plane. A rear surface of the electric wiring tape H1300 is fixedly bonded to the second plate H1400 by using a third adhesive.

Electrically connected regions between the first and second recording device boards H1100, H1101 and the electric wiring tape H1300 are sealed off respectively by a first sealant (not shown) and a second sealant for protection against corrosion caused by contact with the inks and external impacts. The first sealant serves to primarily seal off not only the rear side of the connected regions between the electrode terminals H1302 of the electric wiring tape H1300 and the electrode sections H1104 of the recording device boards H1100, H1101, but also respective outer peripheral portions of the recording device boards H1100, H1101. The second sealant serves to seal off the front side of those connected regions.

The electric contact board H2200 having the external signal input terminals H1301 to receive electric signals from the main unit is electrically connected to the end of the electric wiring tape H1300 by hot melting using an anisotropic conductive film or the like.

The electric wiring tape H1300 is bent at one side of the first plate H1200 and is bonded to the one side of the first plate H1200 by using the third adhesive. The third adhesive is, e.g., a thermosetting adhesive made of primarily an epoxy resin and having a thickness of 10 to 100 μm.

Figure 11:
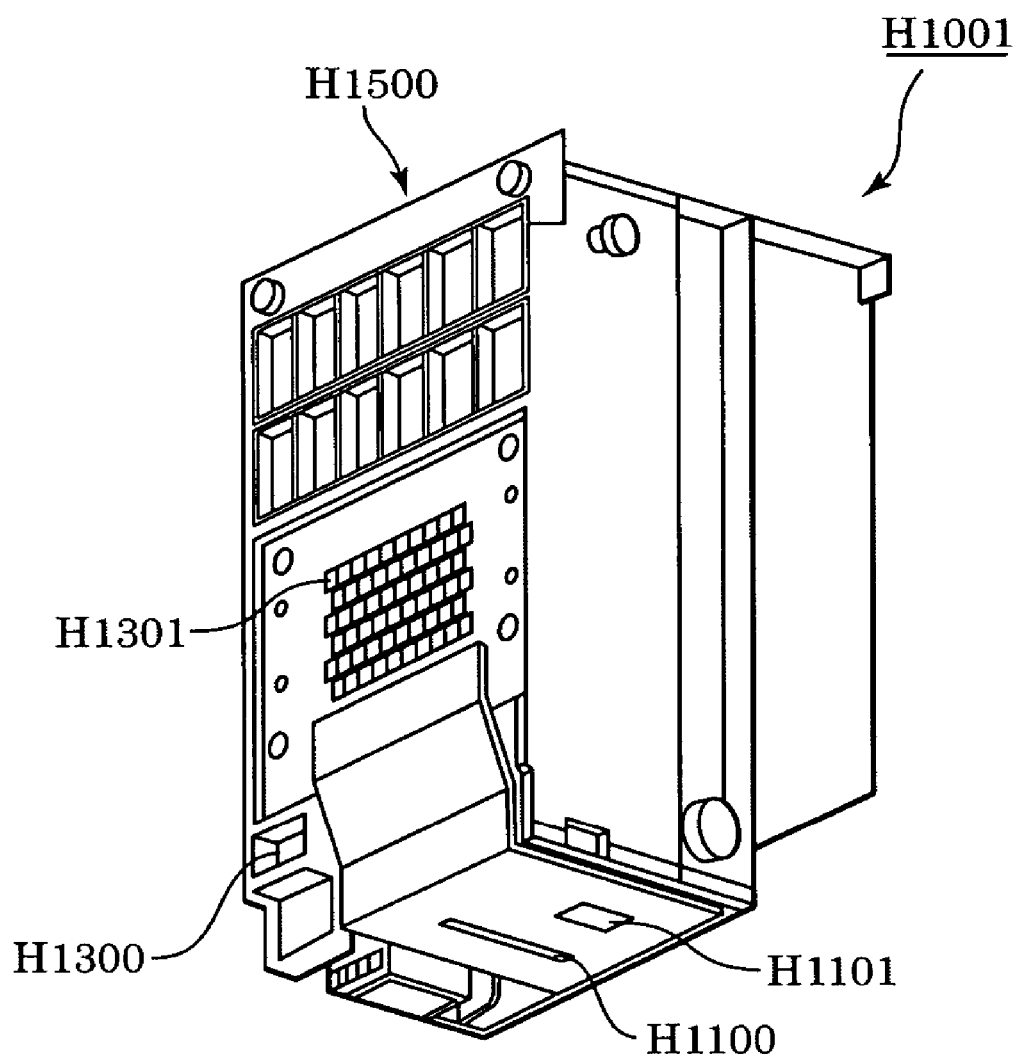
FIG. 11 shows an external appearance of a recording head which can be employed in the present invention.

The recording head H1000 including the first recording device board H1100 (see FIGS. 6 and 7) and the second recording device board H1101 (see FIGS. 2, 6 and 8A), which are assembled in place as described above, constitutes a four-color head as shown in FIG. 11. In an ejection orifice surface of the recording head, an ejection orifice group for ejecting the black (Bk) ink, an ejection orifice group for ejecting the cyan (C) ink, an ejection orifice group for ejecting the yellow (Y) ink, and an ejection orifice group for ejecting the magenta (M) ink are formed parallel to each other in this order along the main scan direction. The Bk ejection orifice group has 304 ejection orifices and ejects the Bk ink in an average volume of 30 pl (picoliter) from each ejection orifice. On the other hand, each of the C, M and Y ejection orifice groups has 128 ejection orifices and ejects the corresponding color ink in average volume of 5 pl (picoliter) from each ejection orifice.

(2-2) Ink Supply Unit

The ink supply member H1500 is formed, for example, by molding a resin material. The resin material may be mixed with glass fillers in the range of 5 to 40% for increasing rigidity in shape.

As shown in FIG. 6, the ink supply member H1500 is one component of the ink supply unit H1003 for supplying the inks from an ink tank H1900 to the recording device unit H1002. In the ink supply member H1500, channel forming members (not shown) are joined to each other by ultrasonic hot melting so as to form ink channels (not shown). Further, a filter (not shown) for preventing intrusion of dust from the exterior is joined to a joint H2300 engaging with the ink tank H1900, and a sealing rubber (not shown) is fitted over the joint H2300 to prevent evaporation of the inks through the joint.

(3) Ink Jet Recording Apparatus

The construction of the ink jet recording apparatus will be described below with reference to FIGS. 9 to 11.

FIG. 9 shows an external appearance of a mechanism assembly in the ink jet recording apparatus, FIG. 10 shows an external appearance of the recording head cartridge used in the ink jet recording apparatus, and FIG. 11 shows an external appearance of the recording head.

In FIG. 9, the ink jet recording apparatus has a mechanism assembly including a recording medium feeder 11 for automatically feeding a recording medium (not shown) in the form of a sheet, a medium transport unit 13 for guiding the recording medium supplied from the recording medium feeder 11 one by one to a desired recording position (position opposed to the recording head) and for guiding the recording medium from the recording position to a recording medium ejector 12, a recording unit for performing a predetermined recording process on the recording medium transported to the recording position, and a recovery unit 14 for performing a recovery process of the recording unit.

The recording unit includes a carriage 16 supported so as to scan along a carriage shaft 15, and a head cartridge (i.e., the head cartridge H1000 in FIG. 10) detachably mounted on the carriage 16 through a head set lever 17.

The carriage 16 mounted on the head cartridge H1000, shown in FIG. 10, is provided with a carriage cover 20 for positioning the recording head H1001 (FIG. 11) of the head cartridge H1000 in a predetermined mount position on the carriage 16, and also provided with the head set lever 17 for pressing the recording head H1001 to be held in the predetermined mount position. The head set lever 17 serving as a cartridge attaching/detaching means is rotatably fitted over a head set lever shaft (not shown) in an upper portion of the carriage 16, and a head set plate (not shown) biased by a spring is disposed in a portion of the carriage 16 engaging with the recording head H1001. The recording head H1001 is mounted onto the carriage 16 while the recording head H1001 is pressed by a resilient force applied from the head set plate.

One end of a not-shown contact flexible print cable (hereinafter referred to as a "contact FPC") 22 is coupled to another portion of the carriage 16 engaging with the recording head H1001. A contact section (not shown) formed at one end of the contact FPC 22 is electrically contacted with a contact section of the recording head H1001, i.e., the external signal input terminals H1301, as shown in FIG. 11, such that various kinds of information required for printing are transferred and electric power is supplied to the recording head H1001.

An elastic member (not shown), such as a rubber, is disposed between the contact section of the contact FPC 22 and the carriage 16 so as to ensure a reliable contact between the contact section of the contact FPC 22 and the contact section of the recording head H1001 by the elastic force applied from the elastic member and the pressing force applied from the head set plate. The other end of the contact FPC 22 is connected to a carriage board (not shown) mounted on the rear side of the carriage 16.

(4) Configuration of Control System

Figure 12:
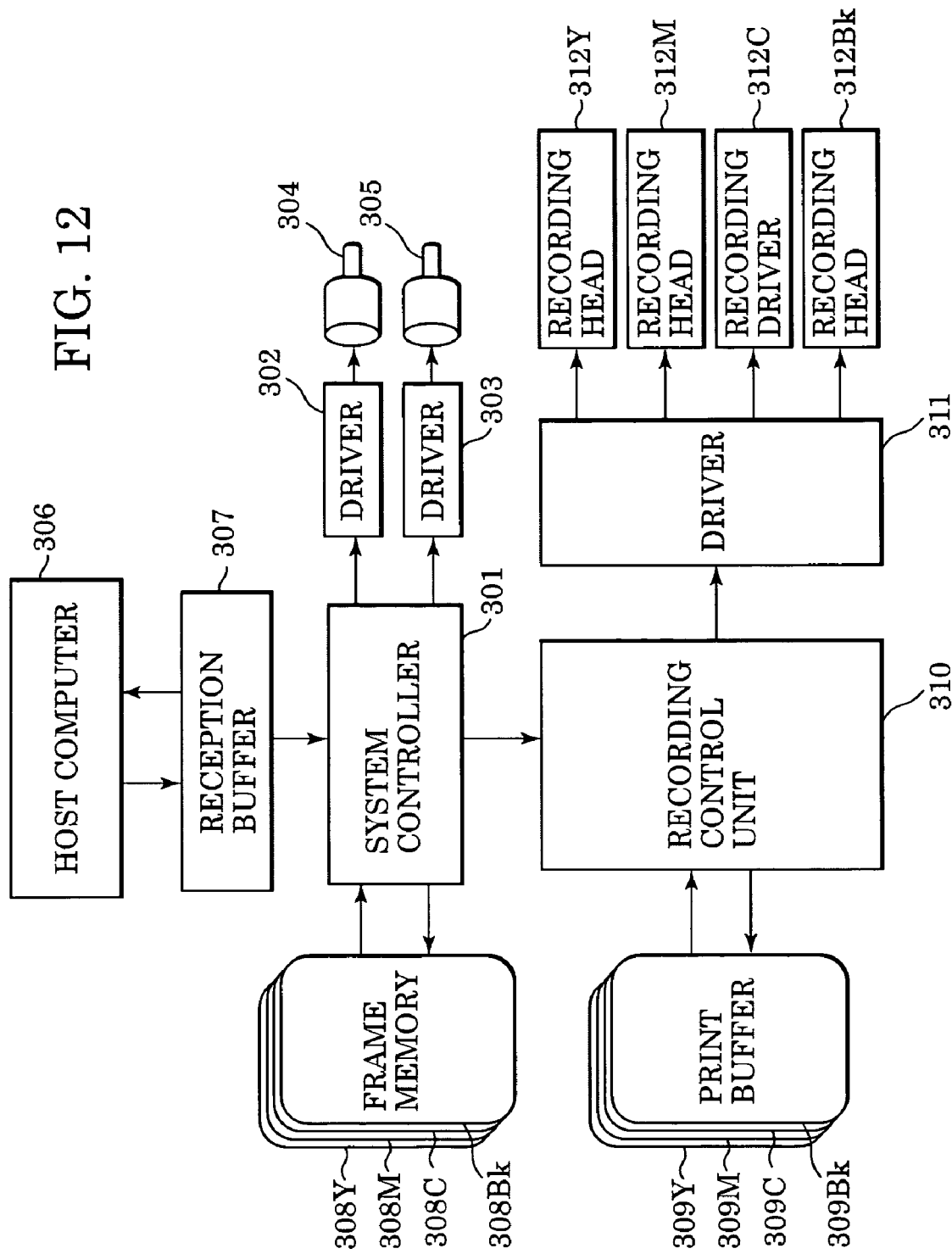
FIG. 12 is a block diagram showing a configuration of a control system for an ink jet recording apparatus which can be employed in the present invention.

FIG. 12 is a block diagram showing a configuration of a control system for the ink jet recording apparatus described above. A system controller 301 for controlling the overall system incorporates a microprocessor, a first memory (ROM) for storing control programs, etc., a second memory (RAM) having a work area, etc. used when the microprocessor executes processing, and so on. The first memory stores mask patterns for distributing image data corresponding to each of predetermined areas on the recording medium to plural scans.

A driver 302 drives a carriage motor 304 for moving the carriage 16 in the main scan direction substantially perpendicular to the direction in which the ejection orifices are arrayed. Also, a driver 303 drives a feed motor 305 for moving the recording medium in the sub-scan direction perpendicular to the main scan direction.

A host computer 306 is connected to the exterior of the ink jet recording apparatus and executes creation, storage, transfer, etc. of multi-value image data to be supplied to the ink jet recording apparatus. A reception buffer 307 temporarily stores the multi-value image data sent from the host computer 306 and accumulates the received multi-value image data until it is read by the system controller 301. A frame memory 308 (308Y, 308M, 308C, and 308Bk) develops the multi-value image data stored in the reception buffer 307 into binary image data, and has a memory size required for recording data in each unit area of the recording medium. While this embodiment uses a frame memory capable of storing the binary image data for one sheet of the recording medium, the size of the frame memory can be modified as required.

A print buffer 309 (309Y, 309M, 309C, and 309Bk) temporarily stores the binary image data to be recorded. The capacity required for the print buffer 309 changes depending on the number of nozzles (orifices) of the recording head. A recording control unit 310 controls the recording head in accordance with commands from the system controller 301. The recording control unit 310 produces recording data (thinned image data) for next one scan by thinning the binary image data read from the print buffer 309, i.e., the binary image data corresponding to an area that is to be scanned by the recording head in the next scan, with a mask pattern read from the first memory.

A driver 311 drives recording heads 312Y, 312M, 312C and 312Bk. These recording heads are driven in accordance with the recording data sent from the recording control unit 310.

(5) Recording Operation

The recording operation of the ink jet recording apparatus will be described below with reference to FIGS. 1, 5, and 13 to 17. This embodiment is described, by way of example, in connection with the case using so-called 2-pass recording method in which an image is recorded by scanning the recording head twice over each recording area of the recording medium.

Figure 4:
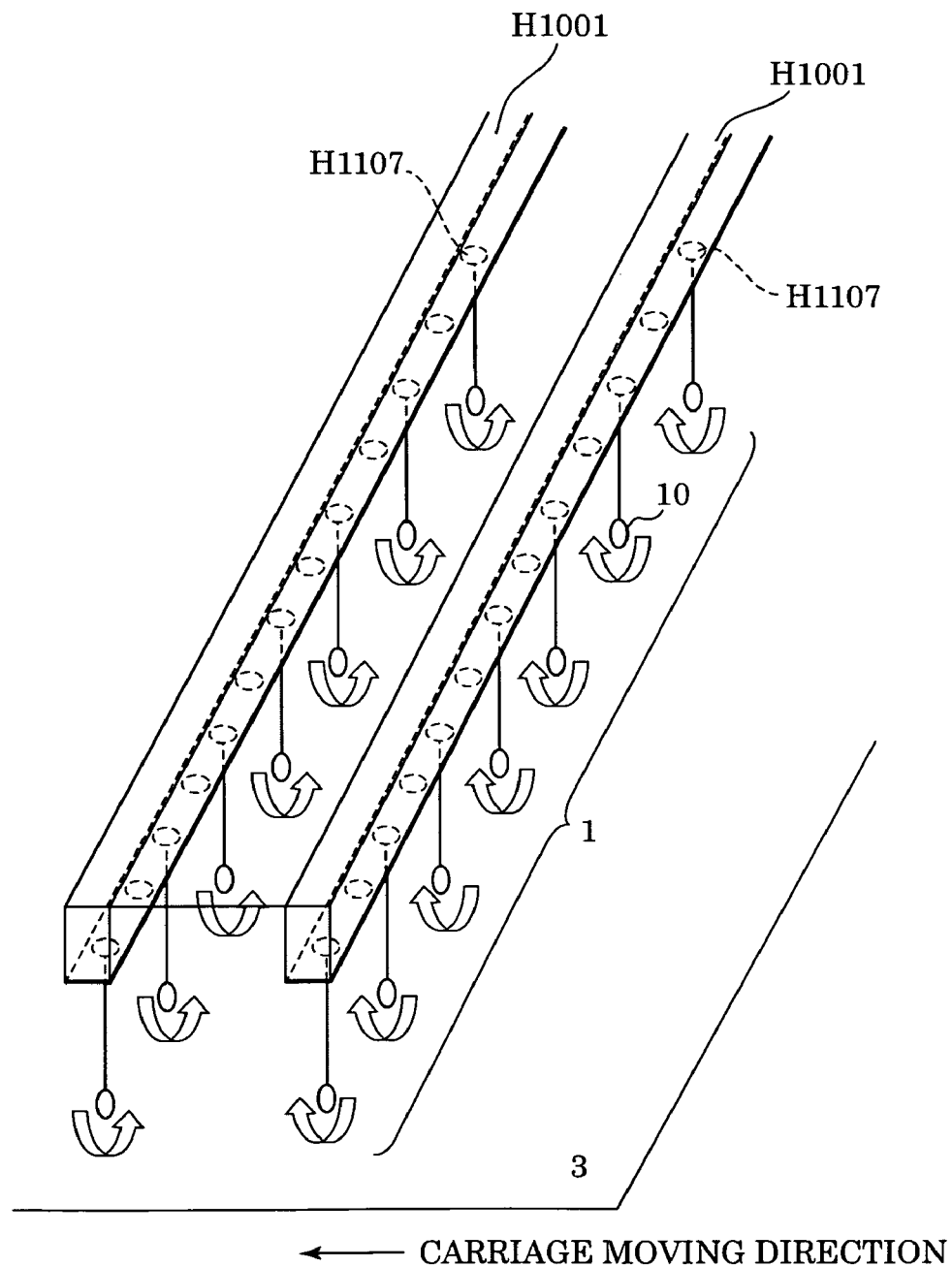
FIG. 4 schematically shows a state of ink ejection from a recording head when a secondary color image is formed in accordance with a known recording method.
Figure 5A:
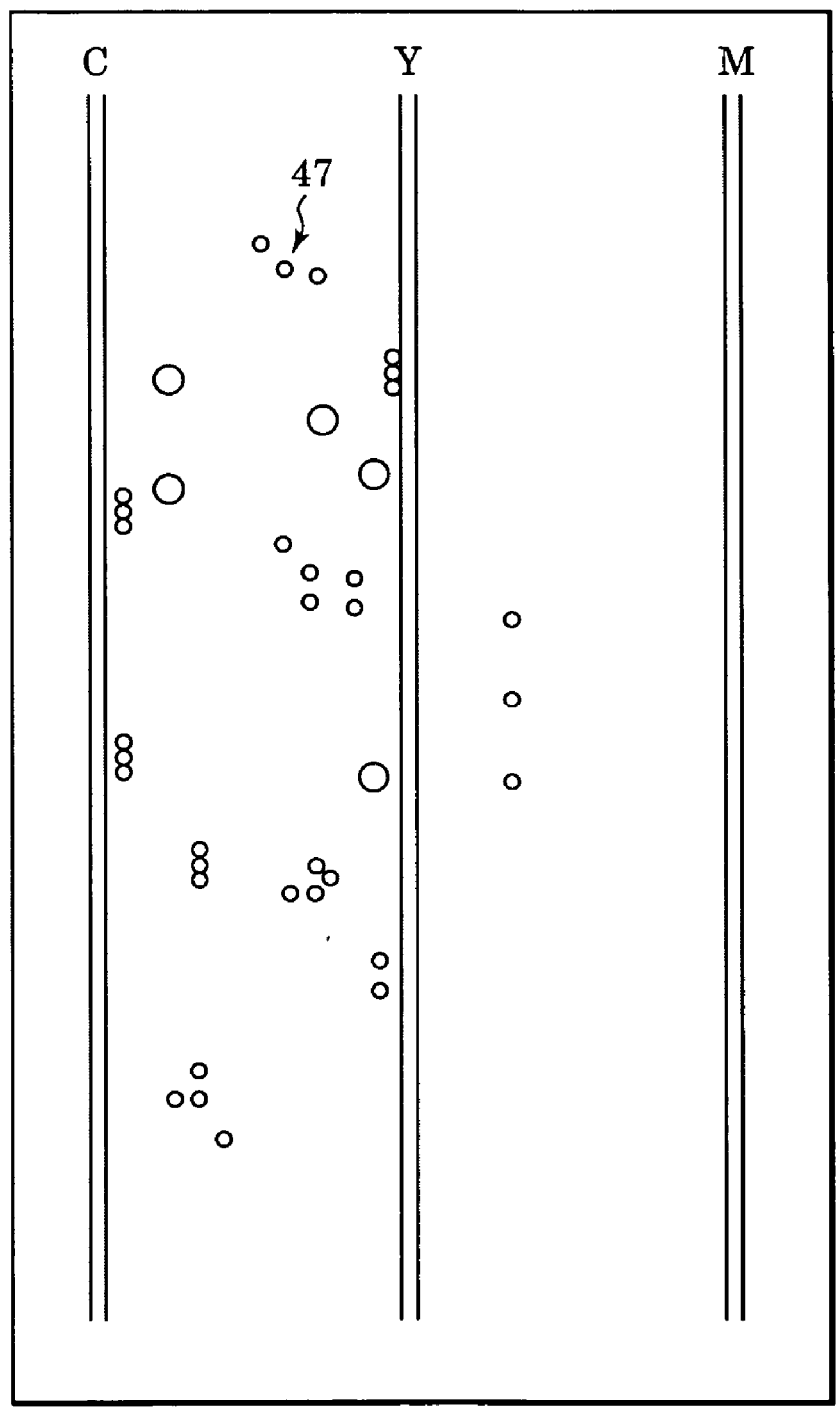
FIG. 5A shows a state of mist attachment to an ejection orifice surface of the recording head when a primary color image is formed in accordance with the known recording method.
Figure 5B:
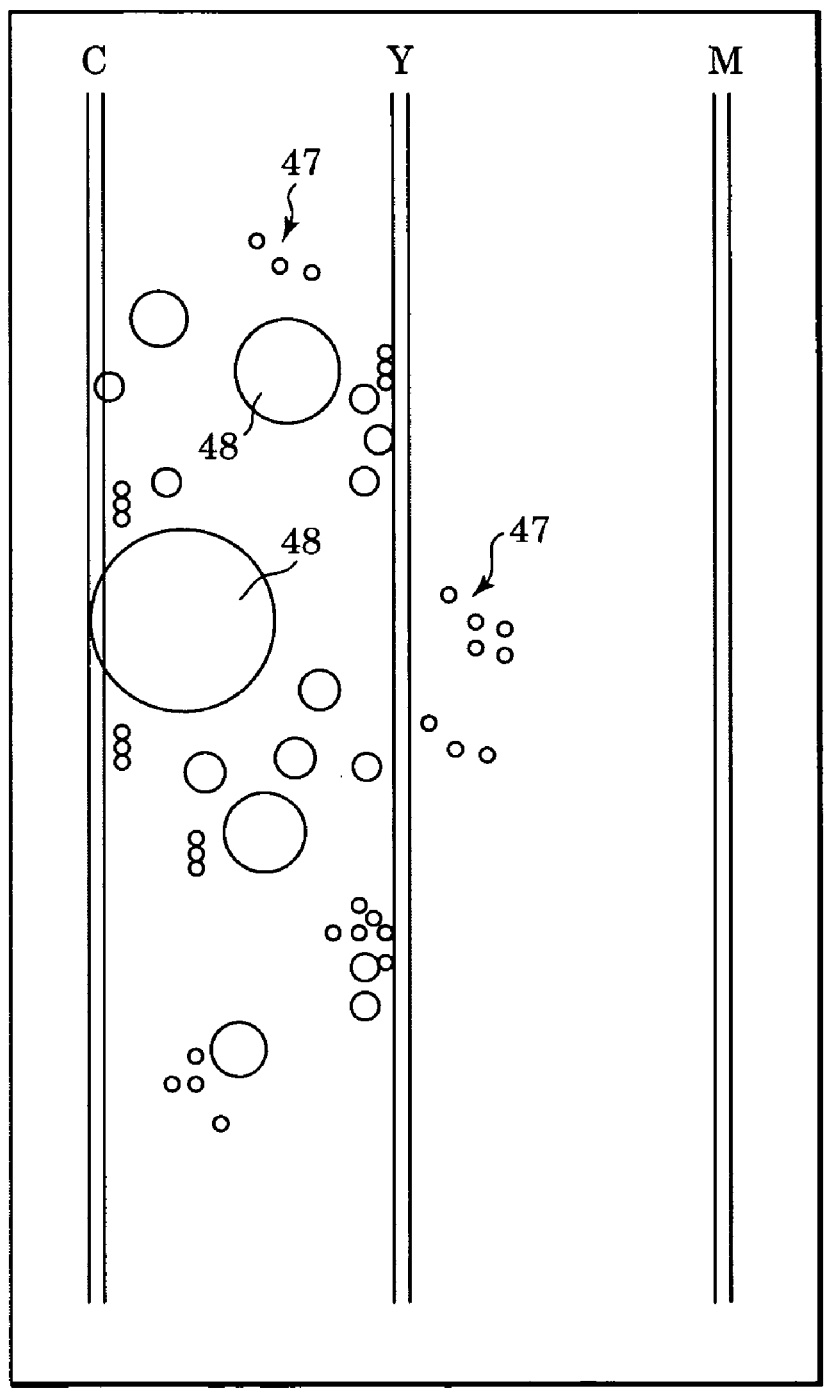
FIG. 5B shows a state of mist attachment to the ejection orifice surface of the recording head when the secondary color image is formed in accordance with the known recording method.

As described above, when each of two adjacent ejection orifice groups operates at a high ejection duty, the air streams 1 generate to flow upward from the recording medium 3 as shown in FIG. 4, and a large amount of ink mists are attached to the ejection orifice surface as shown in FIG. 5B. On the other hand, when at least one of two adjacent ejection orifice groups operates at a low ejection duty, the amount of mists raised up together with the air streams is reduced and the amount of mists attached to the ejection orifice surface is small as shown in FIG. 5A.

In this embodiment, therefore, attention is focused on the ejection duties of two adjacent ejection orifice groups. When the ejection duties of both of the adjacent ejection orifice groups are higher than a predetermined threshold, image data is distributed to scans such that, in the same scan, the ejection duty of one of the adjacent ejection orifice groups is lower than the predetermined threshold. In other words, the ejection duty of each ejection orifice group is detected as shown in a flowchart of FIG. 16, and data distribution is modified depending on the detected result as shown in FIGS. 13A to 13D so that the amount of mists attaching to the ejection orifice surface is reduced.

Figure 16:
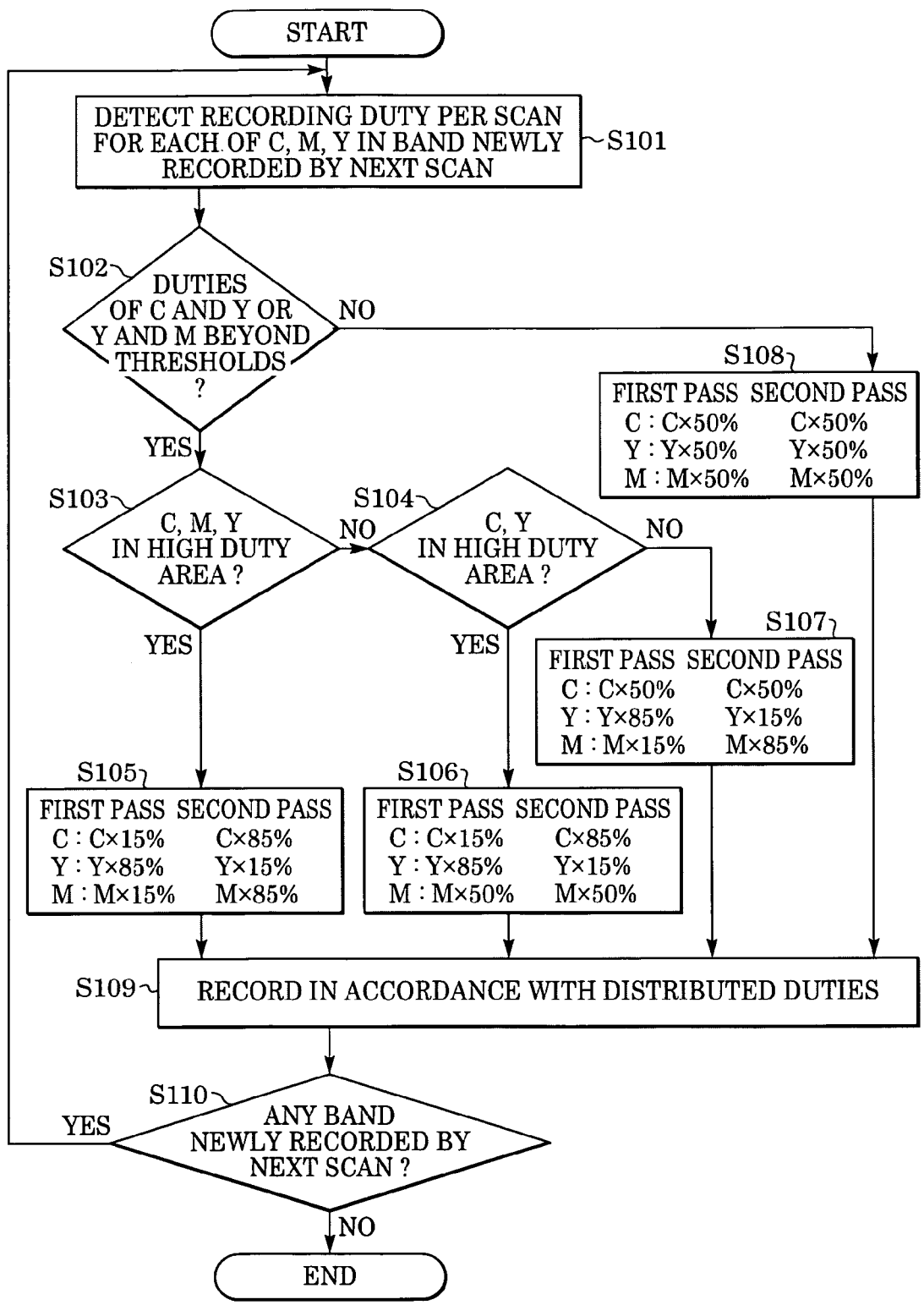
FIG. 16 is a flowchart showing a flow of recording control process in the first embodiment.

FIG. 16 is a flowchart showing a flow of recording control process in this first embodiment, and illustrates processing steps executed during a span from acquisition of image data for the unit area to recording of the image data. Herein, the term "unit area" means a recording area having a width corresponding to a value resulting from dividing the width of the recording head by the number of passes. For example, each of areas shown in FIGS. 13 and 17 corresponds to the "unit area".

While this embodiment employs a head for four colors of CYMK, the following description is made of only data distribution for the CYM ejection orifice groups used to record a secondary or tertiary color that tends to require a high ejection duty. The three ejection orifice groups corresponding to three colors of cyan, yellow and magenta are arranged in this order in the main scan direction as shown in FIGS. 11 and 13, and those ejection orifice groups are scanned twice over the same unit area (i.e., each of first area, second area, third area, . . . , (N-1)-th area and N-th area) in the recording medium.

First, in step S101, image data for one unit area is read from the print buffer 309 per color, and the number of data (i.e., the number of dots) in the read image data, which indicates the actual ink ejection, is counted per color. A recording duty in the unit area (band) per color is calculated based on the counted result, and a recording duty for each scan is calculated from the above result.

Figure 17:
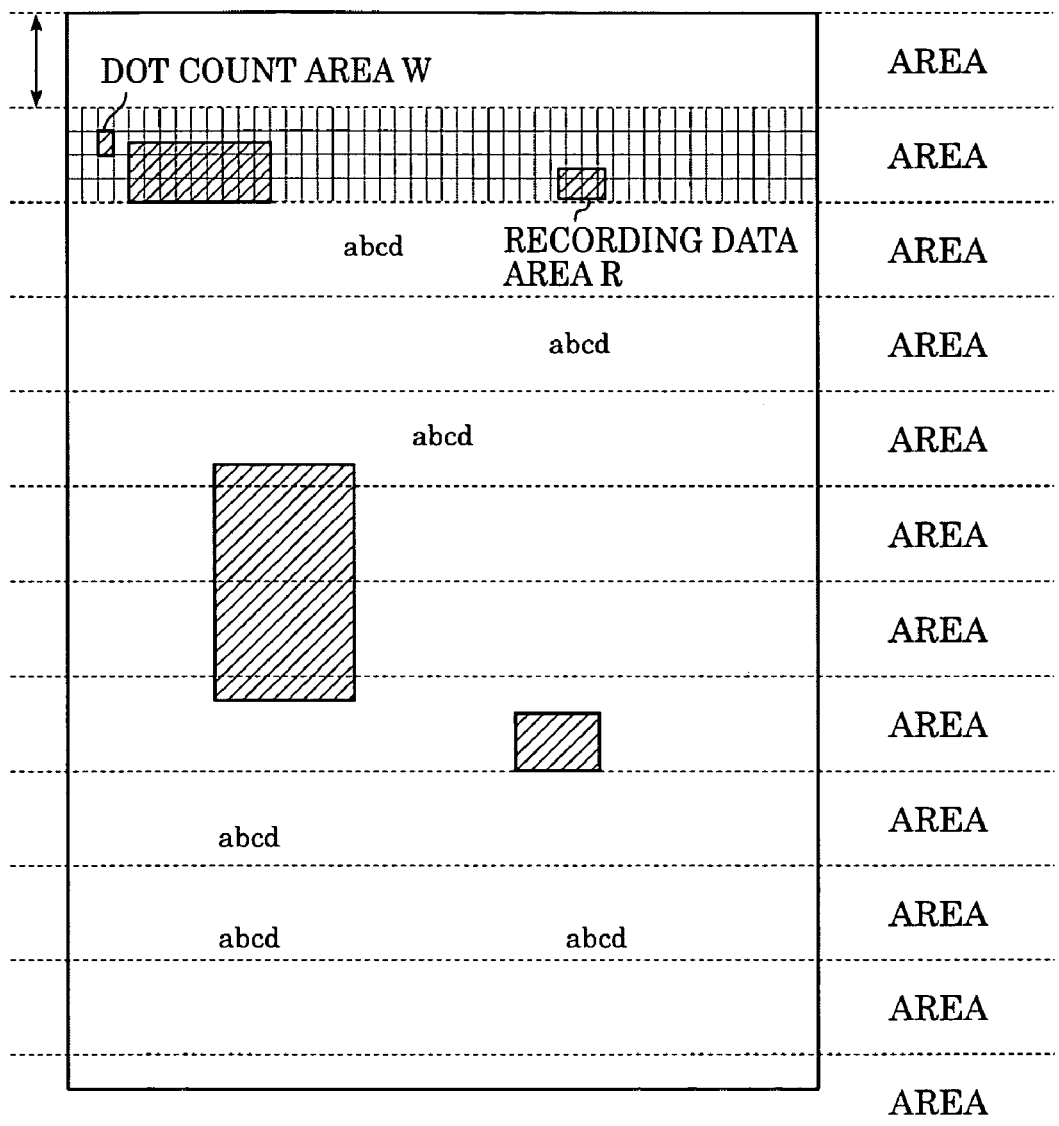
FIG. 17 shows a recording medium in which division areas formed by dividing a unit area in a main scan direction and a sub-scan direction are each defined as a dot count area.

The count of ejection data (i.e., the dot count) is performed over the entire unit area. More specifically, as shown in FIG. 17, the unit area is divided in the main scan direction and the sub-scan direction (i.e., the feed direction of the recording medium). Each of the divided areas is defined as a dot count area W, and the number of dots is counted for each dot count area W. Herein, the dot count area has a size of 16×16 dots. Then, the total number of dots in the unit area is calculated by totalizing the dot numbers of all the dot count areas. The calculation of the total dot number is performed for each color.

Then, the recording duty for each color is calculated based on the total dot number per color. The recording duty for one color is calculated by using Eq. (1) given below. In Eq. (1), "number of recordable dots in unit area" corresponds to (maximum dot number (16×16 in this embodiment) in one dot count area×number of dot count areas W included in one unit area).

recording duty=(total dot number in unit area)÷(number of recordable dots in unit area)×100   Eq. (1):

Finally, the recording duty for each color per scan is calculated based on the thus-obtained recording duty for each color. Because 2-pass recording is performed in this embodiment, the recording duty per scan is given as a value resulting from dividing the recording duty by 2. In other words, assuming the number of passes in multi-pass recording to be N, the recording duty per scan is obtained as (recording duty÷N).

In step S102 of FIG. 16, it is determined whether the recording duty per scan for each of the adjacent ejection orifice groups exceeds a predetermined threshold (16% in this embodiment). In this embodiment, the ejection orifice groups for cyan (C) and yellow (Y) are adjacent to each other, and the ejection orifice groups for cyan (Y) and yellow (M) are adjacent to each other. In step S102, therefore, it is determined whether the recording duty per scan for each of the C ejection orifice group and the Y ejection orifice group exceeds the predetermined threshold, and it is also determined whether the recording duty per scan for each of the Y ejection orifice group and the M ejection orifice group exceeds the predetermined threshold. Stated another way, step S102 determines whether both of the adjacent ejection orifice groups have high duties.

The predetermined threshold is not limited to 16%. The effect of air streams upon the generation of mists varies depending on the head construction and the recording conditions, such as the amount of ejected ink, the number of ejection orifices, the array density of the ejection orifices, the pitch between the ejection orifices, the head driving conditions, and the head scan speed. The predetermined threshold can be modified, as required, based on the head construction and the recording conditions. While respective dot count values for cyan, magenta and yellow are directly used as the dot count values in this embodiment, those dot count values may be calculated with different weights set for respective colors when the extent of effect of air streams upon the generation of mists varies depending on the colors. Further, when the recording conditions differ in such a way, for example, that the amount of ejected ink differs depending on the colors (e.g., the ink in only one color is ejected in larger amount), the dot count values can be calculated, taking into account that point as well.

If it is determined in step S102 of FIG. 16 that both of the adjacent ejection orifice groups have high duties, the flow advances to step S103 where it is determined whether all of the CYM ejection orifice groups have high duties. If the determination result in step S103 is YES, the flow advances to a data distributing process executed in step S105. On the other hand, if the determination result in step S103 is NO, the flow advances to step S104 where it is determined whether the CM ejection orifice groups have high duties. If the determination result in step S104 is YES, the flow advances to a data distributing process executed in step S106. On the other hand, if the determination result in step S104 is NO, i.e., if the MY ejection orifice groups have high duties, the flow advances to a data distributing process executed in step S107. If it is determined in step S102 of FIG. 16 that both of the adjacent ejection orifice groups do not have high duties, the flow advances to a data distributing process executed in step S108.

In step S105 of FIG. 16, data distribution is performed as represented in third and fourth areas shown in FIG. 13A described later. More specifically, in an area where all of the CYM ejection orifice groups have high duties, 15% of C image data read from the print buffer 309 is distributed to the C ejection orifice group used for recording in a first pass, and 85% of the C image data is distributed to the C ejection orifice group used for recording in a second pass. On the other hand, 85% of Y image data read from the print buffer 309 is distributed to the Y ejection orifice group used for recording in the first pass, and 15% of the Y image data is distributed to the Y ejection orifice group used for recording in the second pass. Further, 15% of M image data read from the print buffer 309 is distributed to the M ejection orifice group used for recording in the first pass, and 85% of the M image data is distributed to the M ejection orifice group used for recording in the second pass. Thus, in step S105, the image data is distributed such that the recording duty of one of the adjacent ejection orifice groups is below the predetermined threshold.

In step S106 of FIG. 16, data distribution is performed as represented in third and fourth areas shown in FIG. 13B described later. More specifically, in an area where each of the CY ejection orifice groups has a high duty, 15% of C image data read from the print buffer 309 is distributed to the C ejection orifice group used for recording in a first pass, and 85% of the C image data is distributed to the C ejection orifice group used for recording in a second pass. On the other hand, 85% of Y image data read from the print buffer 309 is distributed to the Y ejection orifice group used for recording in the first pass, and 15% of the Y image data is distributed to the Y ejection orifice group used for recording in the second pass. For the M ejection orifice group that does not have a high duty, 50% of the M image data is distributed to each of the M ejection orifice group used for recording in the first pass and the M ejection orifice group used for recording in the second pass. Thus, in step S106, the image data is distributed such that the recording duty of one of the adjacent CY ejection orifice groups is below the predetermined threshold. Further, for the M ejection orifice group having a low duty, the image data is evenly distributed to two passes.

In step S107 of FIG. 16, data distribution is performed as represented in third and fourth areas shown in FIG. 13C described later. More specifically, in an area where each of the YM ejection orifice groups has a high duty, 85% of Y image data read from the print buffer 309 is distributed to the Y ejection orifice group used for recording in a first pass, and 15% of the Y image data is distributed to the Y ejection orifice group used for recording in a second pass. On the other hand, 15% of M image data read from the print buffer 309 is distributed to the M ejection orifice group used for recording in the first pass, and 85% of the M image data is distributed to the M ejection orifice group used for recording in the second pass. For the C ejection orifice group that does not have a high duty, 50% of the C image data is distributed to each of the C ejection orifice group used for recording in the first pass and the C ejection orifice group used for recording in the second pass. Thus, in step S107, the image data is distributed such that the recording duty of one of the adjacent YM ejection orifice groups is below the predetermined threshold. Further, for the C ejection orifice group having a low duty, the image data is evenly distributed to two passes.

In step S108 of FIG. 16, data distribution is performed as represented in first, second and fifth areas shown in FIGS. 13A to 13C, or in FIG. 13D described later. Stated another way, in an area where one of the adjacent ejection orifice groups has a low duty, the image data is evenly distributed to two passes in each of the CYM ejection orifice groups.

After the data distribution has been performed in steps S105 to S108 as described above, an image is recorded in step S109 by the recording head in accordance with the distributed data. Then, it is determined in step S110 whether there is any unit area (band) to be newly recorded in the next scan. If the determination result in step S110 is YES, the processing of steps S101 to S109 is executed for the band not yet processed. On the other hand, if the determination result in step S110 is NO, the processing ends.

The recording processes performed in steps S105, S106, S107 and S108 of FIG. 16 in accordance with the respective distribution rates will be described below with reference to FIGS. 13A to 13D. FIGS. 13A to 13D schematically show the relationships between duties of image data and distribution of the image data to respective passes corresponding to each recording area of a recording medium.

As shown in FIGS. 13A to 13D, each of the ejection orifice groups for respective colors of cyan, yellow and magenta, includes two subgroups, i.e., a first group (C1, Y1, M1) and a second group (C2, Y2, M2). Each subgroup includes 64 ejection orifices (=128÷2). A numeral affixed per subgroup of each ejection orifice group indicates, in terms of percentage, the distribution rate at which the image data corresponding to each recording area of the recording medium is distributed to two scans.

Figure 13A:
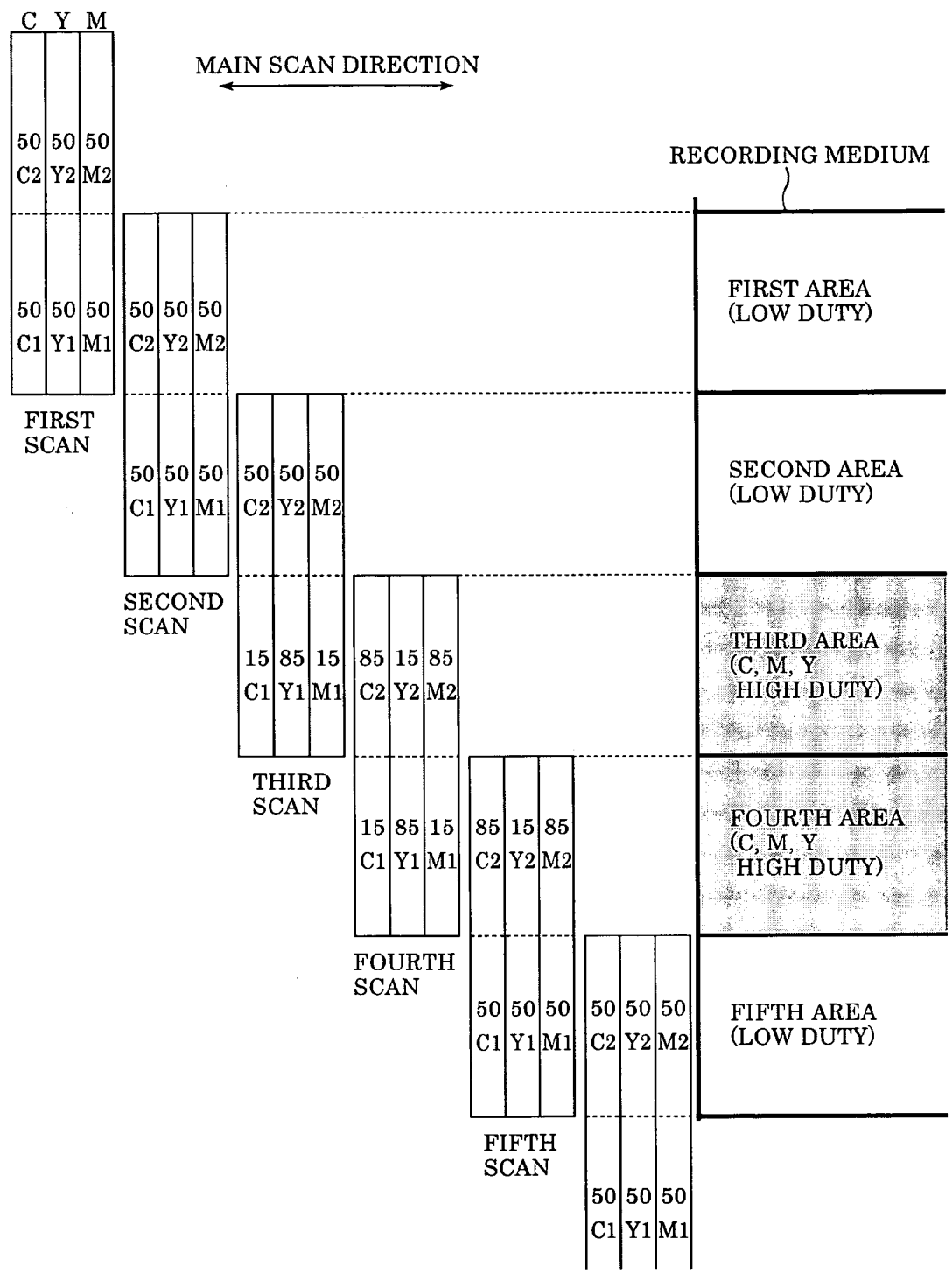
FIGS. 13A to 13D schematically show the relationships between duties of image data and distribution of the image data to respective passes corresponding to each recording area of a recording medium.

FIG. 13A represents a recording process performed when an area where all of the CYM ejection orifice groups have high duties and an area where one of the adjacent ejection orifice groups has a low duty are present in a mixed state. In each of the first, second and fifth areas, one of the adjacent ejection orifice groups has a low duty. In this case, the data distribution is executed as in step S108 of FIG. 16. More specifically, the image data for each of CYM is evenly distributed to the first pass and the second pass. On the other hand, in each of the third and fourth areas, all of the CYM ejection orifice groups have high duties. In this case, the data distribution is executed as in step S105 of FIG. 16. More specifically, the image data for each of C and M is distributed at a rate of 15% to the first pass and 85% to the second pass, while the image data for Y is distributed at a rate of 85% to the first pass and 15% to the second pass.

Figure 14:
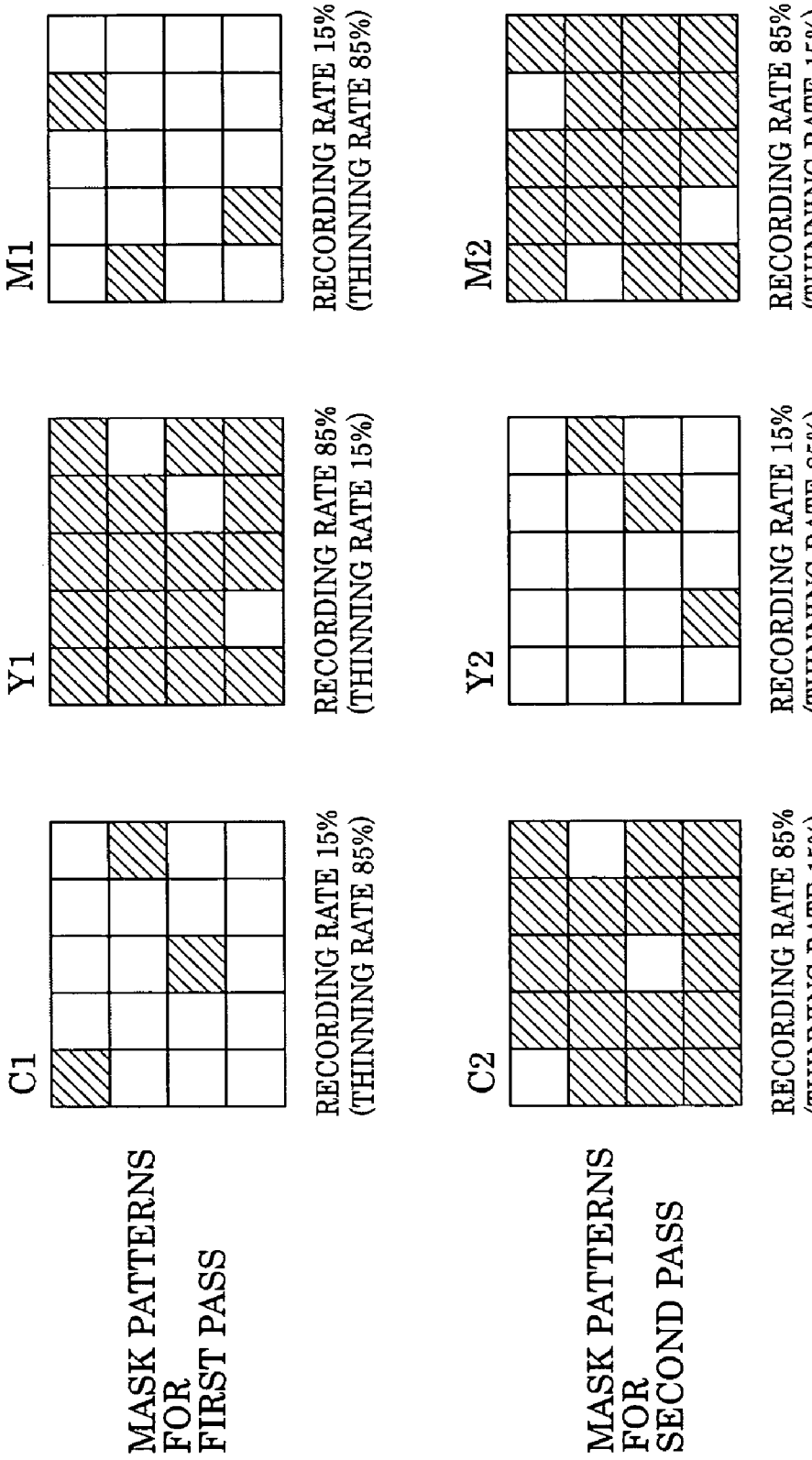
FIG. 14 shows examples of mask patterns having different thinning rates, which can be employed in the first embodiment.
Figure 15:
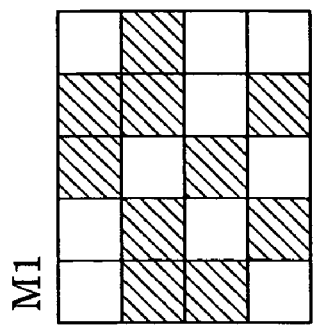
FIG. 15 shows examples of mask patterns having the same thinning rate, which can be employed in the first embodiment.
Figure 15:
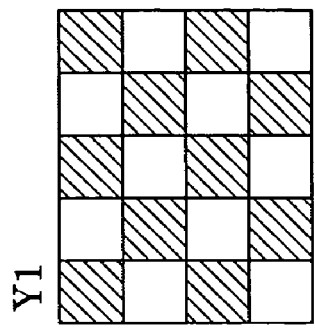
Figure 15:
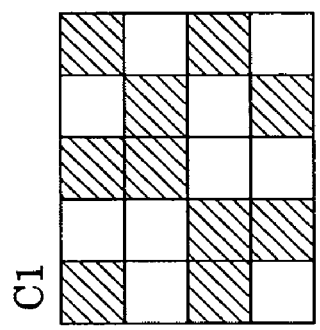
Figure 15:
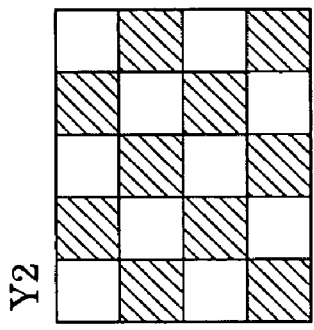
Figure 15:
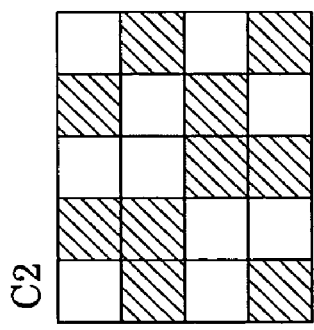

The above-described distribution of the image data is realized by thinning the image data for respective colors of CYM with mask patterns shown in FIGS. 14 and 15. FIG. 14 shows the mask patterns used for thinning the image data corresponding to each unit area at different thinning rates (15% and 85%) in two scans so that the image data is distributed at the different rates to the two scans. More specifically, mask patterns C1, Y1 and M1 are used to produce image data for the first pass and have the thinning rates of 85%, 15% and 85%, respectively. On the other hand, mask patterns C2, Y2 and M2 are used to produce image data for the second pass and have the thinning rates of 15%, 85% and 15%, respectively. Further, the mask patterns C1, Y1 and M1 are correspondent to the first groups C1, Y1 and M1 of the CYM ejection orifice groups, and respective image data thinned by the mask patterns C1, Y1 and M1 are recorded by the first groups C1, Y1 and M1 of the CYM ejection orifice groups in the first pass. The mask patterns C2, Y2 and M2 are correspondent to the second groups C2, Y2 and M2 of the CYM ejection orifice groups, and respective image data thinned by the mask patterns C2, Y2 and M2 are recorded by the second groups C2, Y2 and M2 of the CYM ejection orifice groups in the second pass. Additionally, every two mask patterns (C1 and C2, M1 and M2, or Y1 and Y2) corresponding to the ejection orifice group for each color are in complementary relation to each other. Therefore, recording of all pixels corresponding to the size of the mask pattern is completed by superimposing two sets of thinned image data with each other, which have been thinned with those two mask patterns.

Meanwhile, FIG. 15 shows the mask patterns used for thinning the image data corresponding to each unit area at the same thinning rates (50% and 50%) in two scans so that the image data is evenly distributed to the two scans. More specifically, as in the case of FIG. 14, mask patterns C1, Y1 and M1 are correspondent to the first groups C1, Y1 and M1 of the CYM ejection orifice groups, and mask patterns C2, Y2 and M2 are correspondent to the second groups C2, Y2 and M2 of the CYM ejection orifice groups. Additionally, every two mask patterns (C1 and C2, M1 and M2, or Y1 and Y2) corresponding to the ejection orifice group for each color are in complementary relation to each other.

In FIGS. 14 and 15, each of the mask patterns C1, C2, M1, M2, Y1 and Y2 is shown in the simplified form having four pixels as a size in the array direction of the ejection orifices (i.e., in the vertical direction). In fact, however, each mask pattern has a size corresponding to the same number of pixels as the number of the ejection orifices in each subgroup (i.e., 64 pixels in this embodiment). Also, each mask pattern is shown in the simplified form having five pixels as a size in the main scan direction (i.e., in the horizontal direction). In fact, however, each mask pattern has a size corresponding to a number M of pixels (e.g., 800 pixels) so that periodic unevenness of the mask pattern will not occur. Thus, each of the mask patterns C1, C2, M1, M2, Y1 and Y2 has a size of 64×M pixels.

The terms "thinning rate" and "recording rate" of the mask pattern are defined as follows. The "thinning rate" of the mask pattern represents, in terms of percentage, a rate of the number of recording disallowed pixels (white pixels) with respect to the total number (20 pixels in the cases of FIGS. 14 and 15) of recording allowed pixels (black pixels) and the recording disallowed pixels (white pixels) which jointly constitute the mask pattern. The term "recording allowed pixel" means a pixel for which recording is allowed. In other words, if the image data corresponding to the recording allowed pixel is data requesting actual ink ejection, that pixel is recorded, and if it is data not requesting actual ink ejection, that pixel is not recorded. On the other hand, the term "recording disallowed pixel" means a pixel for which recording is not allowed regardless of whether the image data requests ejection or non-ejection of the ink. Even if the image data corresponding to the recording disallowed pixel is data requesting the ink ejection, that pixel is not recorded. Furthermore, the "recording rate" of the mask pattern means a value resulting from subtracting the thinning rate (%) from 100 (%). Thus, the "recording rate" of the mask pattern represents, in terms of percentage, a rate of the number of the recording allowed pixels (black pixels) with respect to the total number of the recording allowed pixels (black pixels) and the recording disallowed pixels (white pixels) which jointly constitute the mask pattern.

Returning to FIG. 13A again, a process of recording thinned images, which have been obtained by thinning with the mask patterns shown in FIGS. 14 and 15, in successive areas will be described below. The CYM ejection orifice groups successively record an image by ejecting the inks toward the recording medium while reciprocally moving in the main scan direction (i.e., the direction indicated by an arrow in the drawing) substantially perpendicular to the direction in which the ejection orifices are arrayed. Each time when the main scan is completed, the recording medium is advanced in units of a distance corresponding to the width of one subgroup (i.e., 64 ejection orifices) of each ejection orifice group in the sub-scan direction perpendicular to the main scan direction. Accordingly, the image in each area (i.e., the area corresponding to the width of one subgroup) of the recording medium is completed only after two scans over the same area.

To explain in more detail, in the first scan, C, Y and M thinned images (first thinned images) obtained by thinning the C, Y and M image data corresponding to the first area with the mask patterns C1, Y1 and M1 each having the recording rate of 50% (thinning rate of 50%) are recorded in the first area of the recording medium by using the ejection orifice groups C1, Y1 and M1.

Then, in the second scan, C, Y and M thinned images (second thinned images) obtained by thinning the C, Y and M image data corresponding to the first area with the mask patterns C2, Y2 and M2 each having the recording rate of 50% (thinning rate of 50%) are recorded in the first area, which has been subjected to the recording in the first scan, by using the ejection orifice groups C2, Y2 and M2. As a result, the first thinned images and the second thinned images are recorded in the first area in superimposed relation, whereby the image in the first area is completed. At the same time, in the second scan, C, Y and M thinned images (first thinned images) obtained by thinning the C, Y and M image data corresponding to the second area with the mask patterns C1, Y1 and M1 each having the recording rate of 50% (thinning rate of 50%) are recorded in the second area in a not-yet-recorded state by using the ejection orifice groups C1, Y1 and M1.

Then, in the third scan, C, Y and M thinned images (second thinned images) obtained by thinning the C, Y and M image data corresponding to the second area with the mask patterns C2, Y2 and M2 each having the recording rate of 50% (thinning rate of 50%) are recorded in the second area, which has been subjected to the recording in the second scan, by using the ejection orifice groups C2, Y2 and M2. As a result, the first thinned images and the second thinned images are recorded in the second area in superimposed relation, whereby the image in the second area is completed. At the same time, in the third scan, C, Y and M thinned images (first thinned images) obtained by thinning the C, Y and M image data corresponding to the third area with the mask pattern C1 having the recording rate of 15% (thinning rate of 85%), the mask pattern Y1 having the recording rate of 85% (thinning rate of 15%), and the mask pattern M1 having the recording rate of 15% (thinning rate of 85%) are recorded in the third area in a not-yet-recorded state by using the ejection orifice groups C1, Y1 and M1.

Then, in the fourth scan, C, Y and M thinned images (second thinned images) obtained by thinning the C, Y and M image data corresponding to the third area with the mask pattern C2 having the recording rate of 85% (thinning rate of 15%), the mask pattern Y2 having the recording rate of 15% (thinning rate of 85%), and the mask pattern M2 having the recording rate of 85% (thinning rate of 15%) are recorded in the third area, which has been subjected to the recording in the third scan, by using the ejection orifice groups C2, Y2 and M2. As a result, the first thinned images and the second thinned images are recorded in the third area in superimposed relation, whereby the image in the third area is completed. At the same time, in the fourth scan, C, Y and M thinned images (first thinned images) obtained by thinning the C, Y and M image data corresponding to the fourth area with the mask pattern C1 having the recording rate of 15% (thinning rate of 85%), the mask pattern Y1 having the recording rate of 85% (thinning rate of 15%), and the mask pattern M1 having the recording rate of 15% (thinning rate of 85%) are recorded in the fourth area in a not-yet-recorded state by using the ejection orifice groups C1, Y1 and M1.

Then, in the fifth scan, C, Y and M thinned images (second thinned images) obtained by thinning the C, Y and M image data corresponding to the fourth area with the mask pattern C2 having the recording rate of 85% (thinning rate of 15%), the mask pattern Y2 having the recording rate of 15% (thinning rate of 85%), and the mask pattern M2 having the recording rate of 85% (thinning rate of 15%) are recorded in the fourth area, which has been subjected to the recording in the fourth scan, by using the ejection orifice groups C2, Y2 and M2. As a result, the first thinned images and the second thinned images are recorded in the fourth area in superimposed relation, whereby the image in the fourth area is completed. At the same time, in the fifth scan, C, Y and M thinned images (first thinned images) obtained by thinning the C, Y and M image data corresponding to the fifth area with the mask pattern C1 having the recording rate of 50% (thinning rate of 50%), the mask pattern Y1 having the recording rate of 50% (thinning rate of 50%), and the mask pattern M1 having the recording rate of 50% (thinning rate of 50%) are recorded in the fifth area in a not-yet-recorded state by using the ejection orifice groups C1, Y1 and M1.

Thus, in the case of FIG. 13A, image recording is successively completed in each of the first to fourth areas of the recording medium by every two scans. For other areas subsequent to the fifth area, image recording is repeatedly performed in a similar way.

Figure 13B:
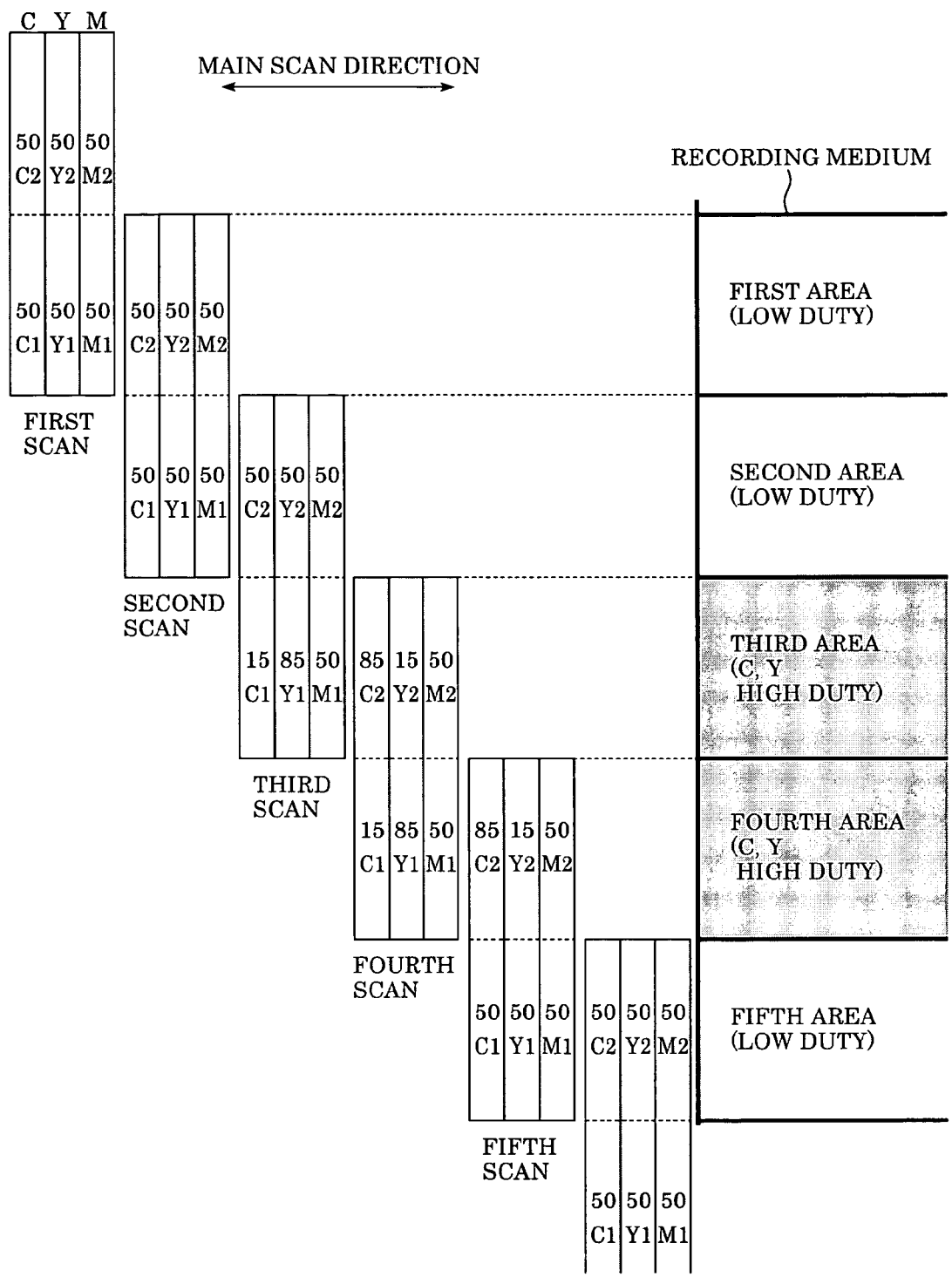

FIG. 13B represents a recording process performed when an area where each of the adjacent CY ejection orifice groups has a high duty and an area where one of the adjacent ejection orifice groups has a low duty are present in a mixed state. In each of the first, second and fifth areas, one of the adjacent ejection orifice groups has a low duty. In this case, the data distribution is executed as in step S108 of FIG. 16. More specifically, the image data for each of CYM is evenly distributed to the first pass and the second pass. This data distribution process is performed by using the mask patterns (C1, C2, Y1, Y2, M1 and M2) shown in FIG. 15. On the other hand, in each of the third and fourth areas, the adjacent CY ejection orifice groups have high duties and the M ejection orifice group has a low duty. In this case, the data distribution is executed as in step S106 of FIG. 16. More specifically, the C image data is distributed at a rate of 15% to the first pass and 85% to the second pass, while the Y image data is distributed at a rate of 85% to the first pass and 15% to the second pass. This data distribution process is performed by using the mask patterns (C1, C2, Y1 and Y2) shown in FIG. 14. The M image data having a low duty is evenly distributed at a rate of 50% to each of the first pass and the second pass. This data distribution process is performed by using the mask patterns (M1, M2) shown in FIG. 15.

Figure 13C:
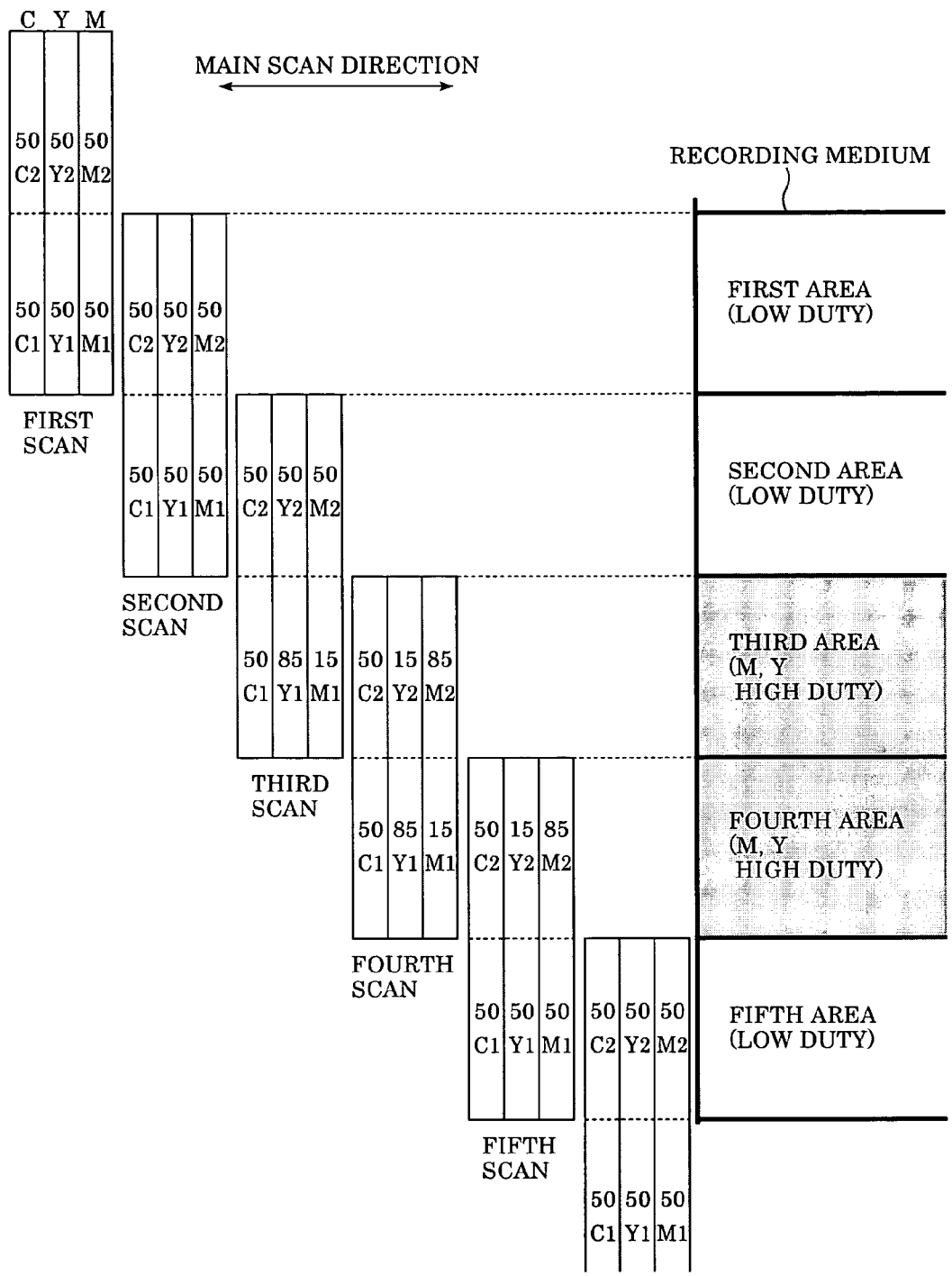

FIG. 13C represents a recording process performed when an area where each of the adjacent YM ejection orifice groups has a high duty and an area where one of the adjacent ejection orifice groups has a low duty are present in a mixed state. In each of the first, second and fifth areas, one of the adjacent ejection orifice groups has a low duty. In this case, the data distribution is executed as in step S108 of FIG. 16. More specifically, the image data for each of CYM is evenly distributed to the first pass and the second pass. This data distribution process is performed by using the mask patterns (C1, C2, Y1, Y2, M1 and M2) shown in FIG. 15. On the other hand, in each of the third and fourth areas, the adjacent YM ejection orifice groups have high duties and the C ejection orifice group has a low duty. In this case, the data distribution is executed as in step S107 of FIG. 16. More specifically, the Y image data is distributed at a rate of 85% to the first pass and 15% to the second pass, while the M image data is distributed at a rate of 15% to the first pass and 85% to the second pass. This data distribution process is performed by using the mask patterns (Y1, Y2, M1 and M2) shown in FIG. 14. The C image data having a low duty is evenly distributed at a rate of 50% to each of the first pass and the second pass. This data distribution process is performed by using the mask patterns (C1, C2) shown in FIG. 15.

Figure 13D:
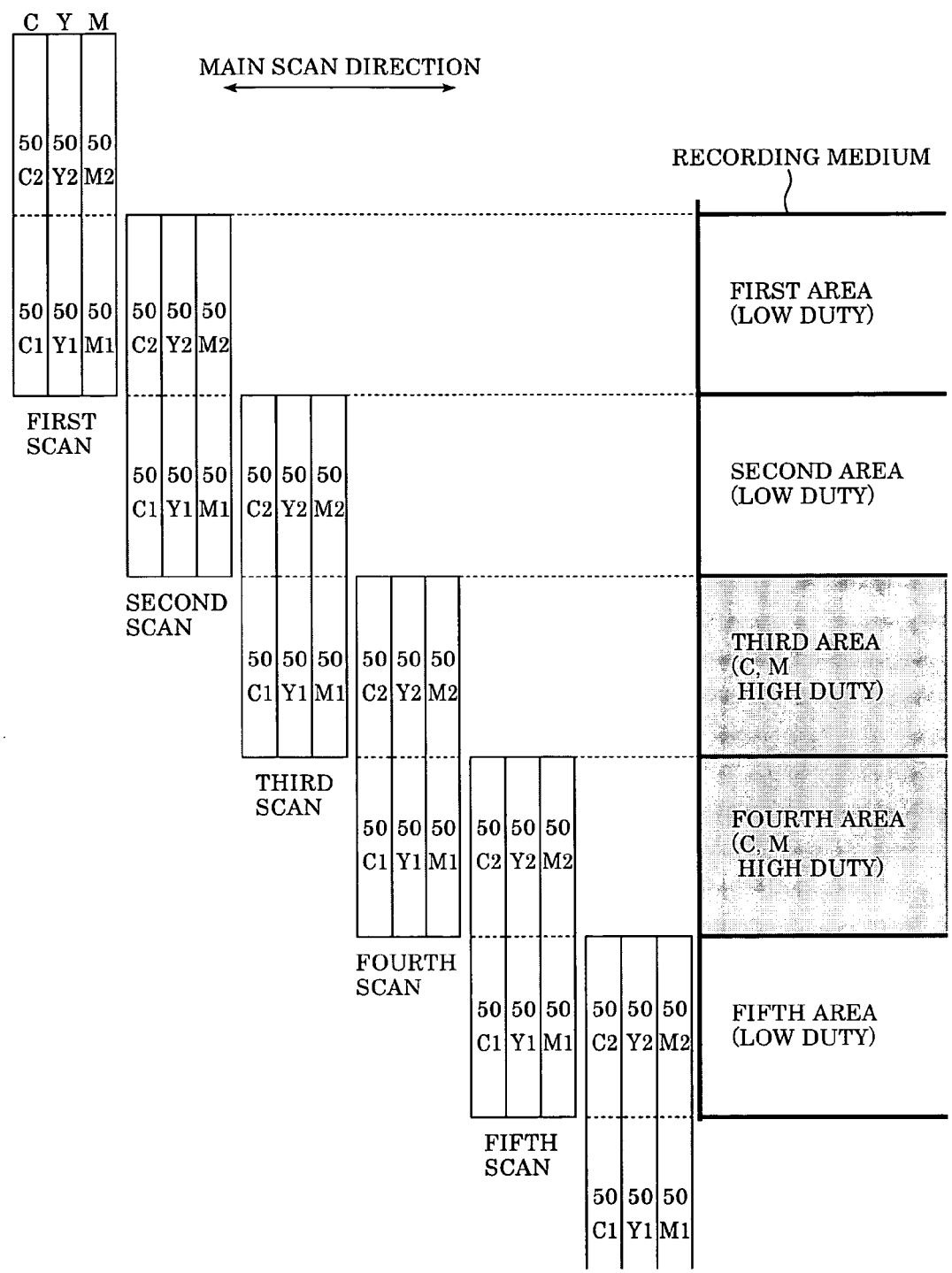

Finally, FIG. 13D represents a recording process performed when an area where each of the CM ejection orifice groups not adjacent to each other has a high duty and an area where one of the adjacent ejection orifice groups has a low duty are present in a mixed state. In each of the first, second and fifth areas, one of the adjacent ejection orifice groups has a low duty. In this case, the data distribution is executed as in step S108 of FIG. 16. More specifically, the image data for each of CYM is evenly distributed to the first pass and the second pass. This data distribution process is performed by using the mask patterns (C1, C2, Y1, Y2, M1 and M2) shown in FIG. 15. On the other hand, in each of the third and fourth areas, the CM ejection orifice groups not adjacent to each other have high duties and the Y ejection orifice group has a low duty. In this case, the data distribution is executed as in step S108 of FIG. 16. More specifically, the image data for each of CYM is evenly distributed to the first pass and the second pass. This data distribution process is performed by using the mask patterns (C1, C2, Y1, Y2, M1 and M2) shown in FIG. 15.

Figure 1A:
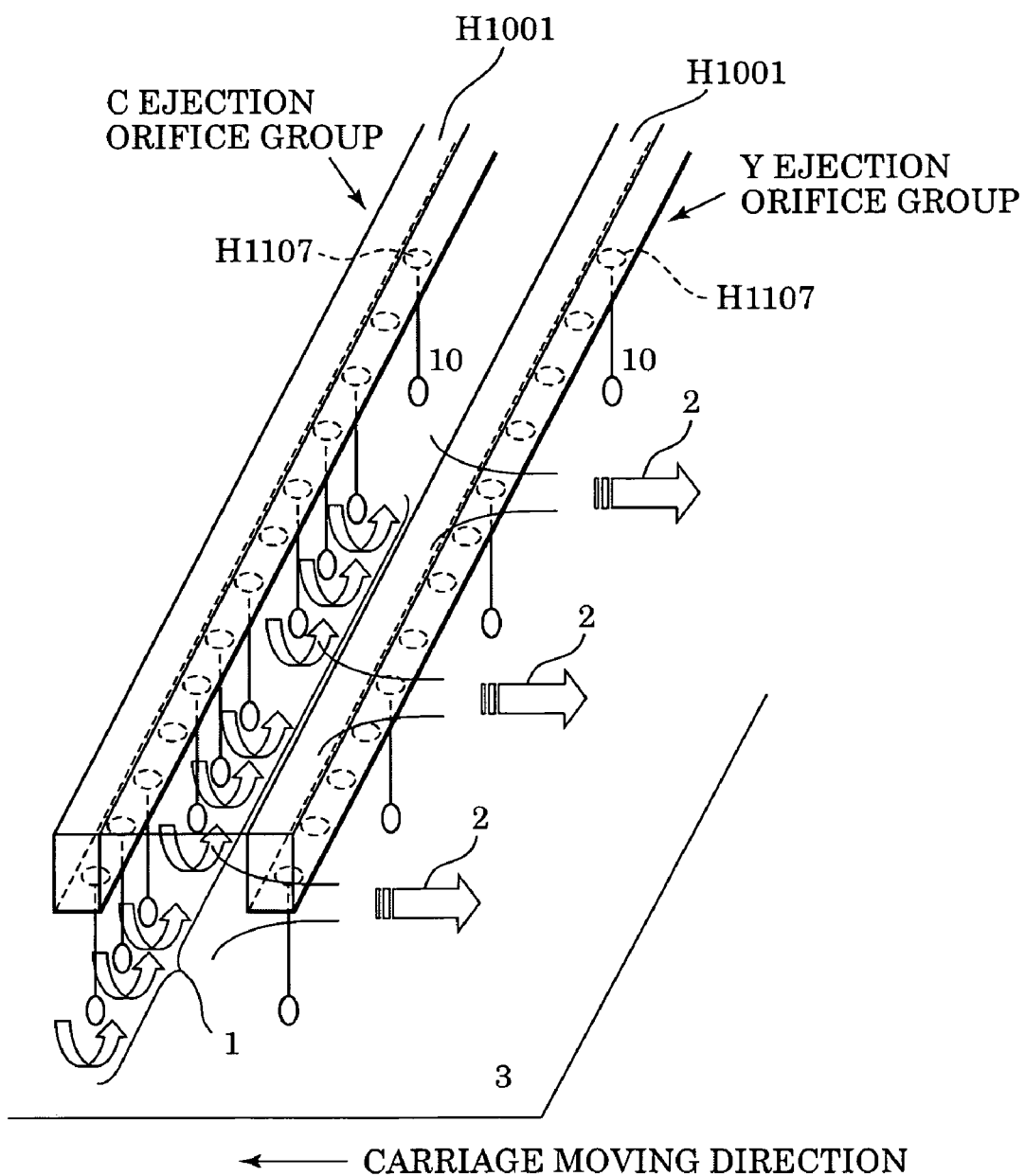
FIGS. 1A and 1B each show an ink ejection state when a recording duty of one of adjacent ejection orifice groups is set to be lower than a threshold.
Figure 1B:
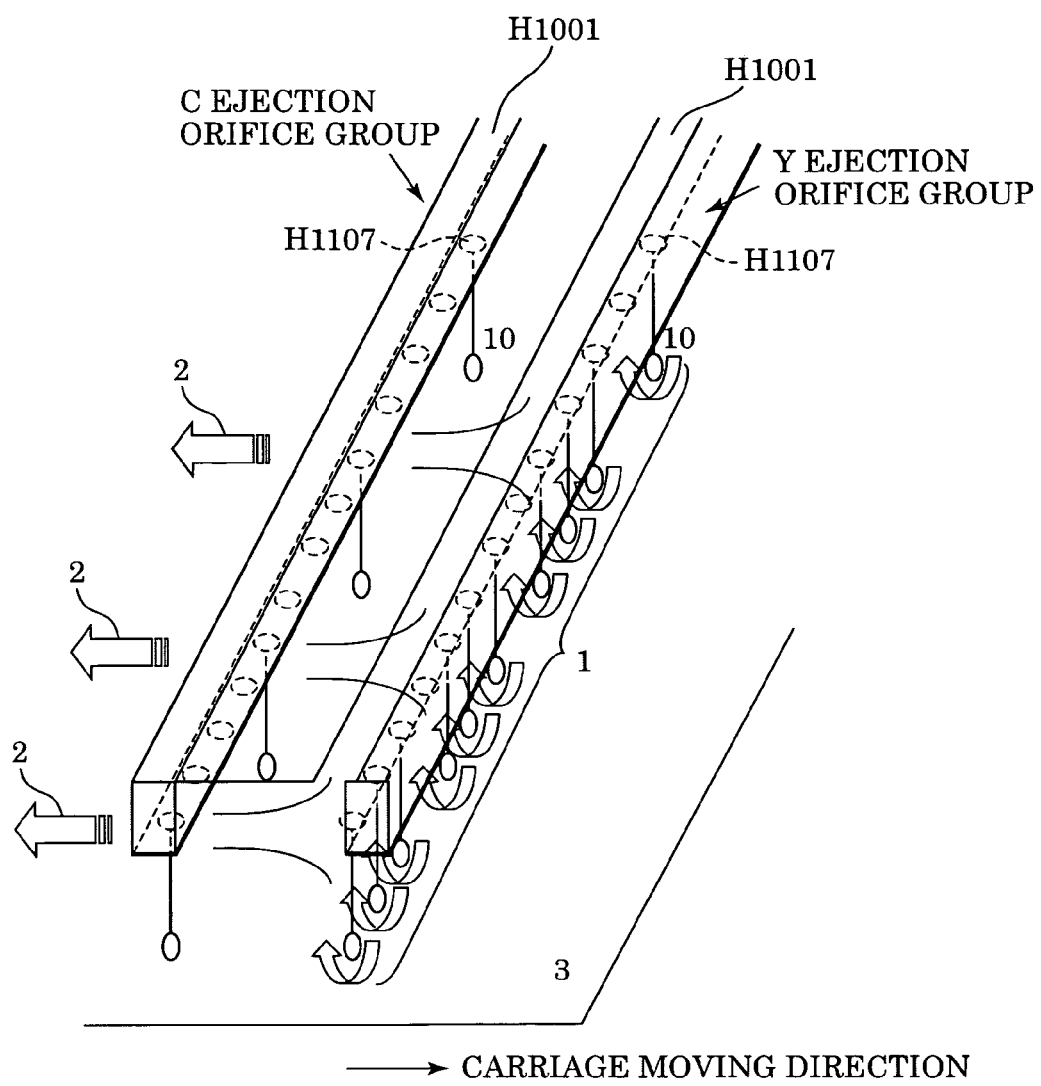

According to the recording process described above with reference to FIGS. 13 to 16, even when the recording duties of both of the adjacent ejection orifice groups are high, the amount of mists raised up with air streams is reduced, as shown in FIG. 1A or 1B, because the image data is distributed such that the recording duty of one of the adjacent ejection orifice groups becomes low.

That point will be described in more detail, by way of example, in connection with the third area in FIG. 13B where the recording duties of both of the adjacent CY ejection orifice groups are high. In the first pass, as shown in FIG. 1B, because the Y ejection orifice group has a high duty, the pressure near the ejection orifices of the Y ejection orifice group is reduced, and therefore air streams are generated so as to curl upward from the recording medium 3 as indicated by arrows 1. Correspondingly, ink mists, such as satellites and splashed inks having been ejected from the Y ejection orifice group and the C ejection orifice group, are going to attach to the ejection orifice surface. However, because the C ejection orifice group has a low duty, escape paths for the curled-up air streams are produced as indicated by arrows 2 in FIG. 1B. In the second pass, as shown in FIG. 1A, because the C ejection orifice group has a high duty, the pressure near the ejection orifices of the C ejection orifice group is reduced, and therefore air streams are generated so as to curl upward from the recording medium 3 as indicated by arrows 1. Correspondingly, ink mists, such as satellites and splashed inks having been ejected from the Y ejection orifice group and the C ejection orifice group, are going to attach to the ejection orifice surface. However, because the Y ejection orifice group has a low duty, escape paths for the curled-up air streams are produced as indicated by arrows 2 in FIG. 1A.

Figure 5C:
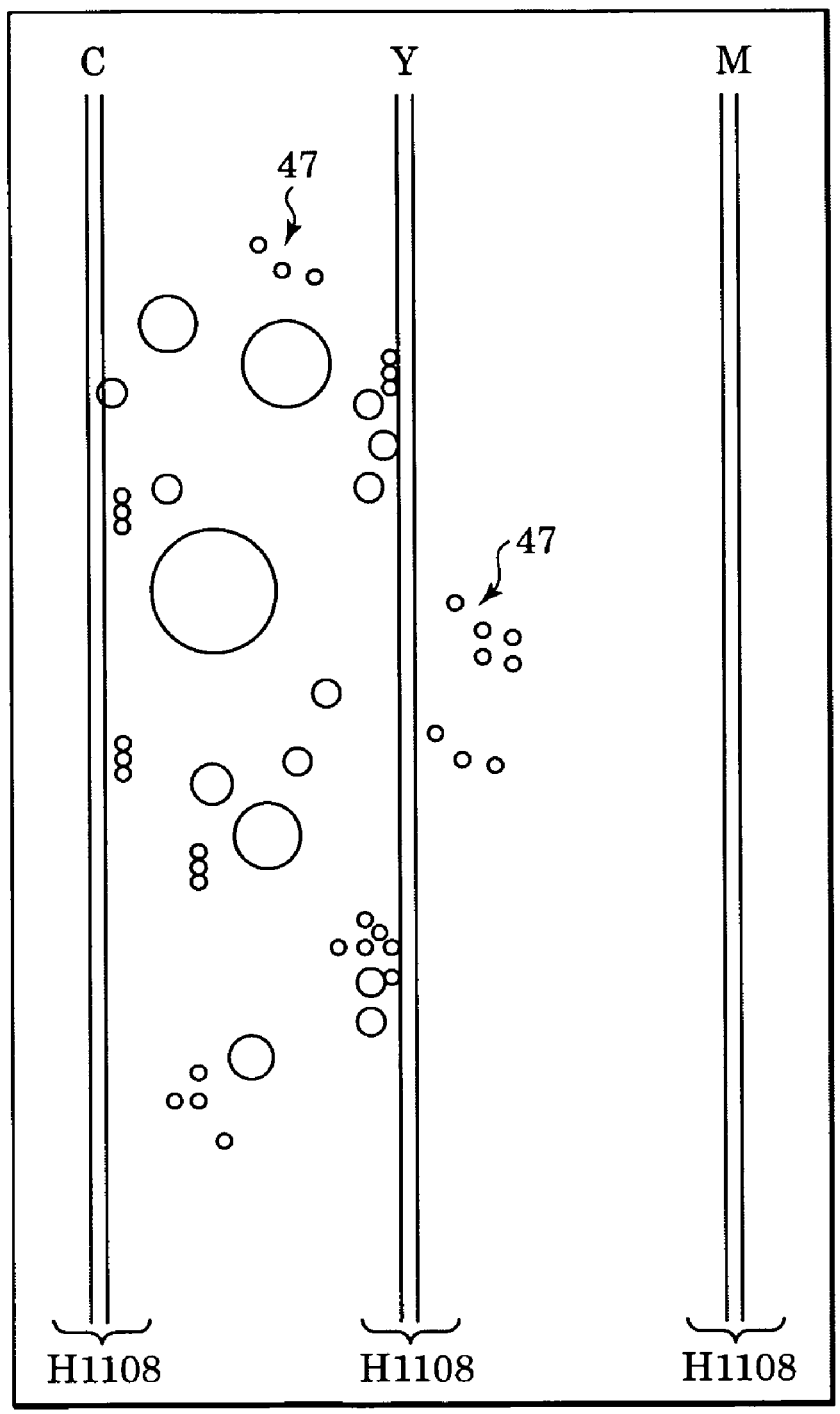
FIG. 5C shows a state of mist attachment to an ejection orifice surface of the recording head when the secondary color image is formed in accordance with the present invention.

Consequently, as shown in FIG. 5C, the amount of mists 47 attaching to the ejection orifice surface can be reduced, and large-size mist masses 48 (see FIG. 5B) can be suppressed from generating through cohesion of ink droplets. It is hence possible to reduce a possibility that the mists clog the ejection orifices and cause an ejection failure.

(First Modification)

The first embodiment is not limited to the 2-pass recording, but it is also applicable to recording using any other desired number of passes, such as 3-pass or 4-pass recording. The number of passes in the multi-pass recording can be changed, as required, depending on characteristics of inks and recording media used, demanded image quality, etc. For example, when image quality is important, recording using a relatively large number of passes, i.e., a 4-pass recording mode, can be employed.

(Second Modification)

In the flowchart of FIG. 16, the recording duty is used to determine whether the adjacent ejection orifice groups have high duties. However, that determination may be performed based on the number of recording dots instead of calculating the recording duty. Because the recording duty and the number of recording dots are in one-to-one relation, definition of the threshold in terms of duty is equivalent to definition of the threshold in terms of dot number. Accordingly, the determination as to whether the adjacent ejection orifice groups have high duties may be performed by defining the threshold in terms of dot number, and then determining whether the number of dots to be recorded in the unit area per unit time exceeds a threshold. In this case, the detection and the determinations in steps S101, S102, S103 and S104 of FIG. 16 are executed by calculating the number of dots and comparing the dot number with the threshold. Since the process of calculating the dot number is easier than the process of calculating the duty from the viewpoint of computation, the former can be executed in the recording apparatus.

Thus, in this embodiment, whether the adjacent ejection orifice groups have high duties can be determined by utilizing either the recording duty in the unit area or the number of recording dots in the unit area. Stated another way, that determination can be performed by utilizing any information regarding the ink amount to be applied to the unit area. In the flowchart of FIG. 16, therefore, whether the adjacent ejection orifice groups have high duties can be determined by obtaining any information regarding the ink amount to be applied to the unit area (e.g., information regarding the recording duty in the unit area or information regarding the number of dots recorded in the unit area) for each color, and determining based on the obtained information whether the ink amount applied from each of the adjacent ejection orifice groups per unit time exceeds a predetermined threshold.

Further, in FIG. 17, the unit area of the recording medium is divided into plural areas in the main scan direction (left-and-right direction in FIG. 17) and the sub-scan direction (vertical direction in FIG. 17), and each of the divided areas is defined as the dot count area W in which the number of dots is counted. However, the present invention is not limited to such an embodiment. For example, the unit area of the recording medium may be divided into plural areas only in the main scan direction, and each of the divided areas may be defined as the dot count area W. As an alternative, the unit area of the recording medium may be divided into plural areas only in the sub-scan direction, and each of the divided areas may be defined as the dot count area W.

According to the first embodiment, as described above, even when high-duty recording of a secondary or tertiary color is performed, the amount of mists attaching to the ejection orifice surface can be reduced, and an ejection failure caused by the attached mists can be suppressed.

Second Embodiment

The second embodiment differs from the first embodiment in construction of the ejection orifice groups for the color inks. Specifically, while the first embodiment uses the head having the CYM ejection orifice groups each arranged in one row as shown in FIG. 8A, this second embodiment uses a head having the CYM ejection orifice groups each arranged in two rows in a zigzag pattern as shown in FIG. 8B.

The arrangement of the ejection orifice groups shown in FIG. 8B will be described in more detail. A number 128 of electro-thermal transducers H1103 serving as thermal energy generating means are arranged on each of both sides of each ink supply opening H1102, which has the form of a through hole like a long groove, in the lengthwise direction at a pitch of 600 dpi in each row. The 128 electro-thermal transducers H1103 in the left row and the 128 electro-thermal transducers H1103 in the right row are arranged offset from each other at a pitch of 1200 dpi. The electro-thermal transducers in those two left and right rows show the zigzag pattern. Accordingly, 256 electro-thermal transducers are arranged for each color, and a total 768 of electro-thermal transducers are arranged for three CYM colors. The head construction shown in FIG. 8B can be thought as being equivalent to the one-row arrangement shown in FIG. 2A in which 256 electro-thermal transducers are arranged in a row at a pitch of 1200 dpi.

Figure 18:
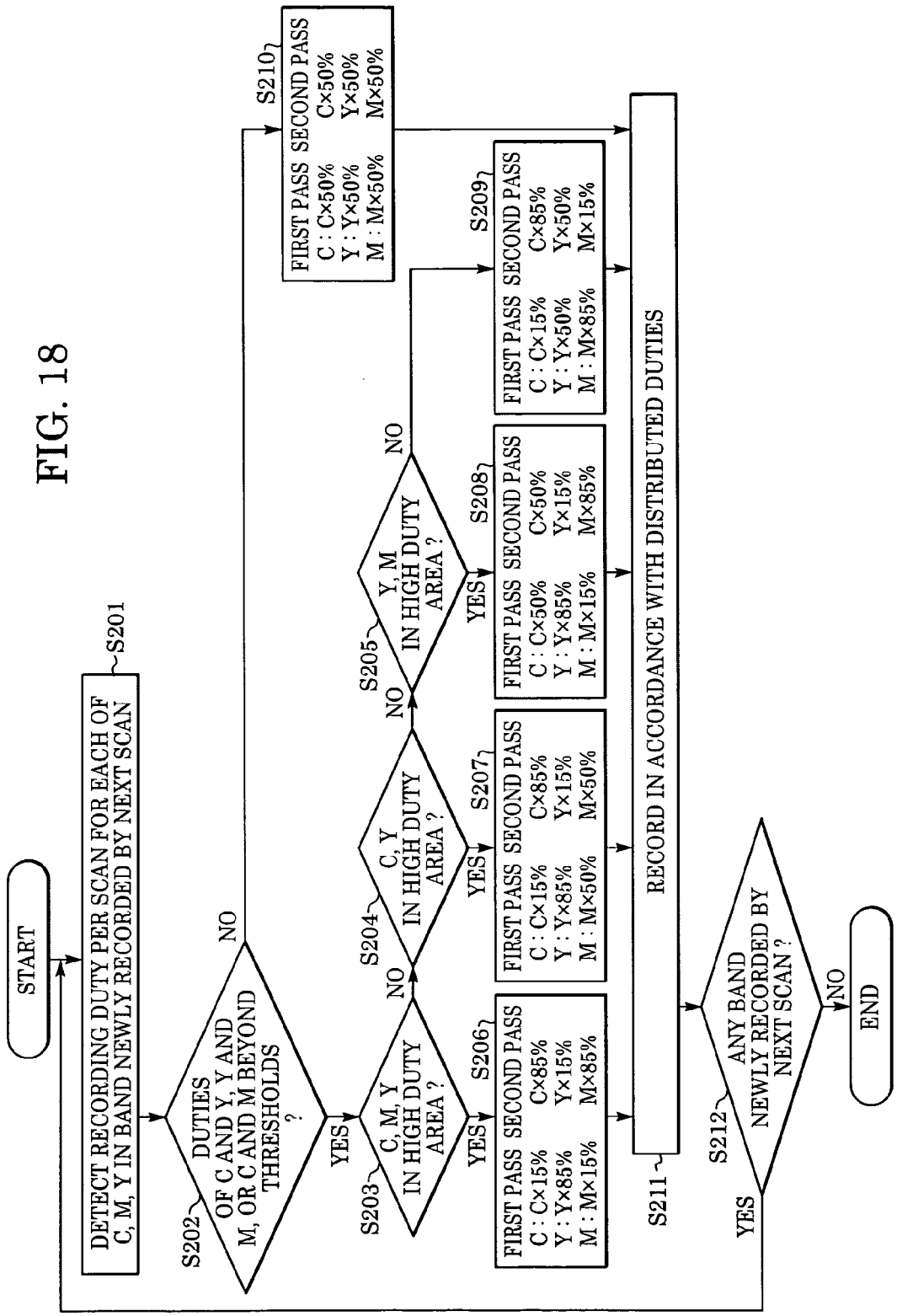
FIG. 18 is a flowchart showing a flow of recording control process in the second embodiment.

FIG. 18 is a flowchart showing a flow of recording control process in the second embodiment, and illustrates processing steps executed a span from acquisition of image data for the unit area to recording of the image data. Manners of computing the recording duty and distributing the data, the number of passes, and the recording method are the same as those in FIG. 16, and a detailed description thereof is omitted here. The following description is made of only different points as compared with FIG. 16.

A first different point is that, when determining a high-duty color, the duty determination is performed for a combination of the CM ejection orifice groups not adjacent to each other (in step S202 of FIG. 18) in addition to the duty determination that is performed for combinations of the adjacent ejection orifice groups in step S102 of FIG. 16.

A second different point is that, even when the CM ejection orifice groups not adjacent to each other have high duties, the duty of one of those ejection orifice groups is set lower than the threshold in the first pass, and the duty of the other ejection orifice group is set lower than the threshold in the second pass (in step S209 of FIG. 18).

In this second embodiment, the array density of the ejection orifices is twice that in the first embodiment, and mists are more apt to rise up with air streams than in the first embodiment. Accordingly, also for the combination of the C ejection orifice group and the M ejection orifice group which are not adjacent to each other, the image data is distributed so as to suppress rising of the air streams, thereby reducing the mount of mists attaching to the ejection orifice surface.

Third Embodiment

In the third embodiment, the color order of the ejection orifice groups in the head shown in FIG. 11 is changed from that in the above-described embodiments. More specifically, though not shown, the ejection orifice groups are arranged in the order of Y, M, C, and K.

Figure 19:
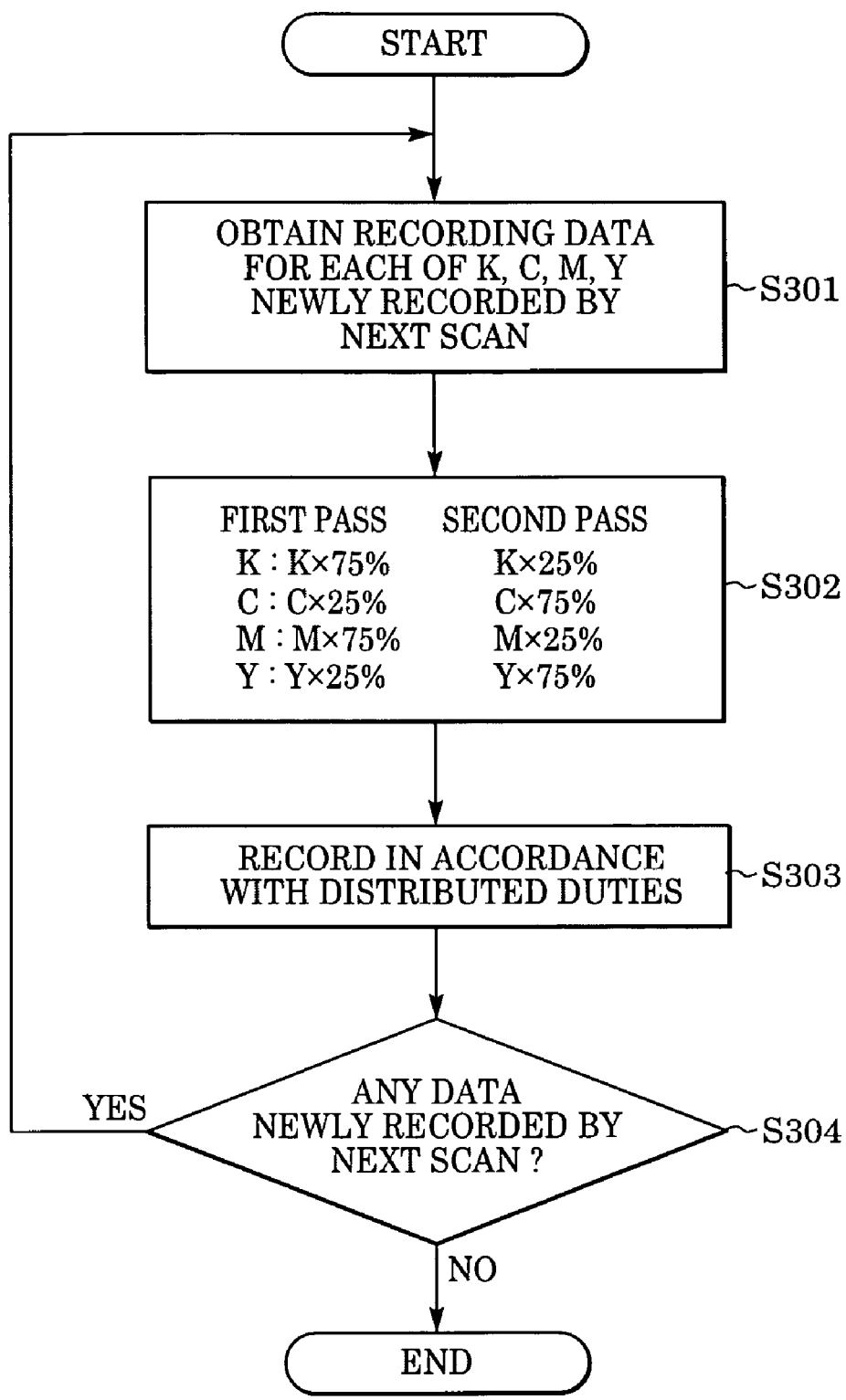
FIG. 19 is a flowchart showing a flow of recording control process in a third embodiment.

FIG. 19 is a flowchart showing a flow of recording control process in the third embodiment, and illustrates processing steps executed during a span from acquisition of image data for the unit area to recording of the image data. As in the first and second embodiments described above, this third embodiment employs the so-called 2-pass recording in which an image to be recording in a unit area is completed by two scans of the recording head.

First, in step S301, image data is read from the print buffer 309 for each unit area to obtain a set of image data per color, i.e., for each of YMCK.

Then, in step S302, the image data per color obtained in step S301 is distributed to two scans. This data distribution is realized with mask patterns shown in FIG. 20.

FIG. 20 shows the relationships between the mask patterns used for distributing the image data for each of Y, M, C and K to two scans and recording nozzles. Each of the mask patterns for the respective colors has a (2×4)-pixel size, as a basic unit, comprising two pixels in the main scan direction and four pixels in the sub-scan direction perpendicular to the main scan direction. That basic size is repeated in the main scan direction and the sub-scan direction so as to constitute the mask pattern that corresponds to the size of the unit area. Definition of white pixels and black pixels in the mask pattern is the same as that described above with reference to FIGS. 14 and 15.

In this third embodiment, the image data is distributed by using the mask patterns, shown in FIG. 20, regardless of whether which ones of the ejection orifice groups have high duties. The mask patterns shown in FIG. 20 is constituted such that, in the same scan, the thinning rate of one of the adjacent ejection orifice groups is higher than a predetermined threshold and the thinning rate of the other ejection orifice group is lower than the predetermined threshold. It is therefore ensured that one of the adjacent ejection orifice groups always has a low duty, and both of the adjacent ejection orifice groups are prevented from having high duties in the same scan.

More specifically, in the first pass, the mask pattern having the thinning rate of 75% is employed for the Y ejection orifice group, and hence 25% of the Y image data is distributed to the first pass. For the M ejection orifice group adjacent to the Y ejection orifice group, the mask pattern having the thinning rate of 25% is employed, and hence 75% of the M image data is distributed to the first pass. For the C ejection orifice group adjacent to the M ejection orifice group, the mask pattern having the thinning rate of 75% is employed, and hence 25% of the C image data is distributed to the first pass. For the K ejection orifice group adjacent to the C ejection orifice group, the mask pattern having the thinning rate of 25% is employed, and hence 75% of the K image data is distributed to the first pass. On the other hand, in the second pass, the image data is distributed at rates reversal to those in the first pass. Thus, in the second pass, 75% of the Y image data, 25% of the M image data, 75% of the C image data, and 25% of the K image data are distributed for the respective ejection orifice groups.

Then, in step S303 of FIG. 19, recording is performed in accordance with the image data distributed in step S302. Thereafter, the flow advances to step S304 in which the same processing as that in the first embodiment is performed. The right side in FIG. 20 illustrates respective states of the recording nozzles when the recording duty for each of YMCK is 100%. The upper right side in FIG. 20 represents the nozzles used for recording odd columns and the nozzles used for recording even columns in the first pass. The lower right side in FIG. 20 represents the nozzles used for recording the odd columns and the nozzles used for recording the even columns in the second pass. As seen from FIG. 20, even when the image data has a high duty, both of the adjacent ejection orifice groups can be avoided from having high duties.

According to the third embodiment, as described above, by preparing the mask patterns used in the adjacent ejection orifice groups and having the thinning rates which have been set to have a large difference between them in advance, both of the adjacent ejection orifice groups can be avoided from having high duties regardless of whether which ones of the adjacent ejection orifice groups have high duties in fact. As a result, the amount of mists raised up with air streams can be reduced, and the amount of mists attaching to the ejection orifice surface can be reduced. Further, because of no necessity of the duty determination, the construction of this third embodiment is simpler than those of the first and second embodiments.

Other Embodiments

The present invention can provide superior advantages when applied to a recording head and a recording apparatus of the type, among various ink jet recording methods, including means (e.g., electro-thermal transducers or laser beams) for generating thermal energy as energy that is utilized to perform the ink ejection, and causing a phase change of the ink with the thermal energy.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2003-405903 filed Dec. 4, 2003 and 2004-309552 filed Oct. 25, 2004 which are hereby incorporated by reference herein.

What is claimed is:

1. An ink jet recording method for recording an image in a unit area of a recording medium with a recording head having at least three ejection orifice groups, wherein each of the ejection orifice groups includes a plurality of ejection orifices arrayed in a predetermined direction to eject ink and being arranged in a direction different from the predetermined direction, and wherein the ejection orifice groups are arranged to define a plurality of adjacent ejection orifice groups, the method comprising the steps of:

scanning the recording head relative to the unit area a plurality of times;

distributing image data corresponding to the unit area to a plurality of scans; and recording the image in the unit area in each of the plurality of scans in accordance with the image data distributed in the distributing step in order to complete the image to be recorded in the unit area, wherein the image data corresponding to each of adjacent ejection orifice groups is distributed to the plurality of scans in the distributing step such that, for all of the plurality of adjacent ejection orifice groups, a recording duty of one ejection orifice group of the adjacent ejection orifice groups is lower than a predetermined threshold in each of the plurality of scans and a recording duty of another ejection orifice group of the adjacent ejection orifice groups is higher than the predetermined threshold in each of the plurality of scans.

2. The ink jet recording method according to claim 1, further comprising the steps of:

obtaining, for each of the adjacent ejection orifice groups, information regarding an ink amount to be applied to the unit area based on the image data corresponding to the unit area; and determining, based on the information obtained in the obtaining step, whether a recording duty of each of the adjacent ejection orifice groups exceeds the predetermined threshold, wherein the distributing step includes distributing the image data to the plurality of scans such that the recording duty of one ejection orifice group of the adjacent ejection orifice groups is lower than the predetermined threshold in each of the plurality of scans and the recording duty of another ejection orifice group of the adjacent ejection orifice groups is higher than the predetermined threshold in each of the plurality of scans, responsive to determining that the recording duties of both ejection orifice groups of the adjacent ejection orifice groups exceed the predetermined threshold in the determining step.

3. The ink jet recording method according to claim 1, wherein the distributing step includes thinning the image data corresponding to the unit area with a mask pattern having a preset thinning rate, in each of the plurality of scans relative to the unit area.

4. An ink jet recording method for recording an image on a recording medium with a recording head having at least three ejection orifice groups, wherein each ejection orifice group includes a plurality of ejection orifices arrayed in a predetermined direction to eject ink and is arranged in a direction different from the predetermined direction, and wherein the ejection orifice groups are arranged to define a plurality of adjacent ejection orifice groups, the method comprising the steps of:

scanning the recording head relative to each of a plurality of unit areas of the recording medium a plurality of times;

moving the recording medium and the recording head relative to each other in a sub-scan direction crossing a scan direction during a period between successive scans;

distributing image data corresponding to the unit area to the plurality of scans by thinning the image data corresponding to the unit area with a mask pattern in each of the plurality of scans relative to the unit area; and recording a thinned image in the unit area in each of the plurality of scans in accordance with the thinned image data, thereby completing the image to be recorded in the unit area, wherein a thinning rate of each mask pattern for thinning the image data corresponding to each of adjacent ejection orifice groups is preset such that a recording duty of one ejection orifice group of the adjacent ejection orifice groups is lower than a predetermined threshold in each of the plurality of scans and a recording duty of another ejection orifice group of the adjacent ejection orifice groups is higher than the predetermined threshold in each of the plurality of scans.

5. An ink jet recording method for recording an image in a unit area of a recording medium with a recording head having at least three ejection orifice groups, wherein each of the ejection orifice groups includes a plurality of ejection orifices arrayed in a predetermined direction to eject ink and being arranged in a direction different from the predetermined direction, and wherein the ejection orifice groups are arranged to define a plurality of adjacent ejection orifice groups, the method comprising the steps of:

scanning the recording head relative to the unit area a plurality of times;

obtaining, for each adjacent ejection orifice group, information regarding an ink amount to be applied to the unit area based on the image data corresponding to the unit area;

determining, based on the information obtained in the obtaining step, whether the ink amount applied from each adjacent ejection orifice group per unit time exceeds a predetermined threshold; and distributing, responsive to determining that the ink amounts applied from both ejection orifice groups of the adjacent ejection orifice groups per unit time exceed the predetermined threshold in the determining step, the image data corresponding to each of the adjacent ejection orifice groups to the plurality of scans such that the ink amount applied from one ejection orifice group of the adjacent ejection orifice groups is lower than the predetermined threshold in each of the plurality of scans and the ink amount applied from another ejection orifice group of the adjacent ejection orifice groups is higher than the predetermined threshold in each of the plurality of scans.

6. An ink jet recording apparatus operable to record an image in a unit area of a recording medium, the apparatus comprising:

a recording head including at least three ejection orifice groups, wherein each of the ejection orifice groups includes a plurality of ejection orifices arrayed in a predetermined direction to eject ink and being arranged in a direction different from the predetermined direction, and wherein the ejection orifice groups are arranged to define a plurality of adjacent ejection orifice groups;

a scanning unit configured to scan the recording head relative to the unit area a plurality of times;

a distributor configured to distribute image data corresponding to the unit area to a plurality of scans; and a recording control unit configured to record an image in the unit area in each of the plurality of scans in accordance with the image data distributed by the distributor, thereby completing the image to be recorded in the unit area, wherein the distributor distributes the image data corresponding to each adjacent ejection orifice groups to the plurality of scans such that a recording duty of one ejection orifice group of the adjacent ejection orifice groups is lower than a predetermined threshold in each of the plurality of scans and a recording duty of another ejection orifice group of the adjacent ejection orifice groups is higher than the predetermined threshold in each of the plurality of scans.

7. An ink jet recording apparatus operable to record an image on a recording medium, the apparatus comprising:

a recording head including at least three ejection orifice groups, wherein each ejection orifice group includes a plurality of ejection orifices arrayed in a predetermined direction to eject ink and is arranged in a direction different from the predetermined direction, and wherein the ejection orifice groups are arranged to define a plurality of adjacent ejection orifice groups;

a scanning unit configured to scan the recording head relative to each of a plurality of unit areas of the recording medium by a plurality of times;

a moving unit configured to move the recording medium and the recording head relative to each other in a sub-scan direction crossing a scan direction during a period between successive scans;

a distributing unit configured to distribute image data corresponding to the unit area to the plurality of scans by thinning the image data corresponding to the unit area with a mask pattern in each of the plurality of scans relative to the unit area; and a recording control unit configured to record a thinned image in the unit area in each of the plurality of scans in accordance with the thinned image data, thereby completing the image to be recorded in the unit area, wherein a thinning rate of each mask pattern for thinning the image data corresponding to each adjacent ejection orifice groups is preset such that a recording duty of one ejection orifice group of the adjacent ejection orifice groups is lower than a predetermined threshold in each of the plurality of scans and a recording duty of another ejection orifice group of the adjacent ejection orifice groups is higher than the predetermined threshold in each of the plurality of scans.

8. An ink jet recording apparatus operable to record an image in a unit area of a recording medium, the apparatus comprising:

scanning unit configured to scan the recording head relative to the unit area a plurality of times;

a recording head including ejection orifice groups, wherein each of the ejection orifice groups includes a plurality of ejection orifices arrayed in a predetermined direction to eject ink and being arranged in a direction different from the predetermined direction, and wherein the ejection orifice groups are arranged to define a plurality of adjacent ejection orifice groups;

an obtaining unit configured to obtain, for each adjacent ejection orifice group, information regarding an ink amount to be applied to the unit area based on the image data corresponding to the unit area;

a determining unit configured to determine, based on the information obtained by the obtaining unit, whether the ink amount applied from each of the adjacent ejection orifice groups per unit time exceeds a predetermined threshold; and a distributing unit configured to distribute, responsive to the determining unit determining that the ink amounts applied from both ejection orifice groups of the adjacent ejection orifice groups per unit time exceed the predetermined threshold, the image data corresponding to each of the adjacent ejection orifice groups to the plurality of scans such that the ink amount applied from one ejection orifice group of the adjacent ejection orifice groups is lower than the predetermined threshold in each of the plurality of scans and the ink amount applied from anther ejection orifice group of the adjacent ejection orifice groups is higher than the predetermined threshold in each of the plurality of scans.

* * * * *